(12) United States Patent
Kim et al.

(10) Patent No.: US 12,544,269 B2
(45) Date of Patent: Feb. 10, 2026

(54) METHOD AND DEVICE FOR RECOGNIZING GAIT INFORMATION USING PLURALITY OF MAGNETIC SENSORS

(71) Applicant: JEONGSEOK CHEMICAL CORPORATION, Jeollabuk-do (KR)

(72) Inventors: Yong-Hyun Kim, Jeollabuk-do (KR); Seok-Hee Im, Jeollabuk-do (KR); Dae-Won Kim, Jeollabuk-do (KR)

(73) Assignee: JEONGSEOK CHEMICAL CORPORATION, Jeollabuk-do (KR)

( * ) Notice: Subject to any disclaimer, the term of this patent is extended or adjusted under 35 U.S.C. 154(b) by 418 days.

(21) Appl. No.: 18/012,425

(22) PCT Filed: Jun. 3, 2021

(86) PCT No.: PCT/KR2021/006902
§ 371 (c)(1),
(2) Date: Dec. 22, 2022

(87) PCT Pub. No.: WO2021/261794
PCT Pub. Date: Dec. 30, 2021

(65) Prior Publication Data
US 2023/0240895 A1 Aug. 3, 2023

(30) Foreign Application Priority Data
Jun. 23, 2020 (KR) .................. 10-2020-0076501
Jun. 23, 2020 (KR) .................. 10-2020-0076502

(51) Int. Cl.
*A61F 9/08* (2006.01)
*A61H 3/06* (2006.01)
*G01V 3/165* (2006.01)
*H01F 41/24* (2006.01)

(52) U.S. Cl.
CPC .............. *A61F 9/08* (2013.01); *A61H 3/061* (2013.01); *A61H 3/066* (2013.01); *A61H 3/068* (2013.01); *G01V 3/165* (2013.01); *H01F 41/24* (2013.01)

(58) Field of Classification Search
None
See application file for complete search history.

(56) References Cited

U.S. PATENT DOCUMENTS

| 7,195,596 B2 | 3/2007 | Tsubata | |
| 2006/0289624 A1* | 12/2006 | Olmos | A61F 9/08 235/375 |
| 2016/0295978 A1* | 10/2016 | Hyde | A61H 3/0288 |
| 2021/0300381 A1* | 9/2021 | Hong | E01F 9/30 |

FOREIGN PATENT DOCUMENTS

| CN | 104631282 | 5/2015 |
| EP | 3038012 | 6/2016 |
| JP | 2001-200212 | 7/2001 |

(Continued)

*Primary Examiner* — Thomas S Mccormack
(74) *Attorney, Agent, or Firm* — Wells St. John P.S.

(57) ABSTRACT

Provided are a method and device for recognizing gait information using a plurality of magnetic sensors. The method for recognizing gait information generates a magnetic sensing signal from a magnetic paint painted on the ground, generates a frequency-converted signal using the magnetic sensing signal, and generates gait information using the frequency-converted signal.

16 Claims, 26 Drawing Sheets

(56) References Cited

FOREIGN PATENT DOCUMENTS

| | | |
|---|---:|---:|
| JP | 3-231659 | 11/2001 |
| JP | 2001-327526 | 11/2001 |
| JP | 2004-121625 | 4/2004 |
| JP | 2009-2155526 | 9/2009 |
| JP | 2016-171972 | 9/2016 |
| KR | 10-1999-0084147 | 12/1999 |
| KR | 10-2011-0138534 | 12/2011 |
| KR | 10-2019-0115503 | 10/2019 |
| KR | 10-2122747 | 6/2020 |
| WO | WO PCT/KR2021/006902 | 9/2021 |

* cited by examiner

| DIMENSION AND ELEMENT | 1D, TWO UNIT ELEMENTS | NUMBER OF TYPES OF INFORMATION THAT CAN BE PROVIDED | 2D, 2 × 2 UNIT ELEMENTS | NUMBER OF TYPES OF INFORMATION THAT CAN BE PROVIDED |
|---|---|---|---|---|
| COMBINATION OF UNIT INFORMATION | (N,S) | 4 | (N,S) x (N,S) | 16 |
| | (R,G,B) | 9 | (R,G,B) x (R,G,B) | 81 |
| | (N,S) x (R,G,B) | 36 | $(N,S)^2 \times (R,G,B)^2$ | 1296 |

| | R (RED) | G (GREEN) | B (BLUE) |
|---|---|---|---|
| N-POLE | 0 | 1 | 2 |
| S-POLE | 3 | 4 | 5 |

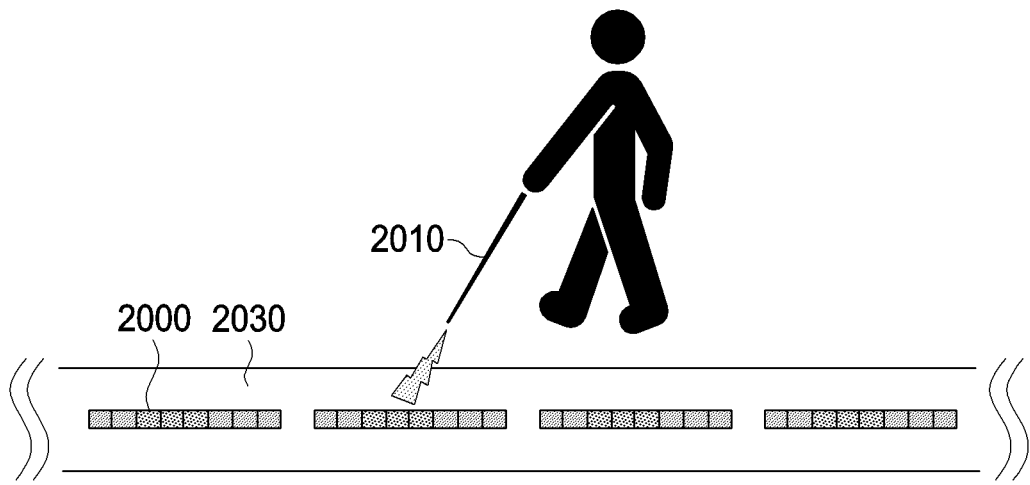
FIG. 20
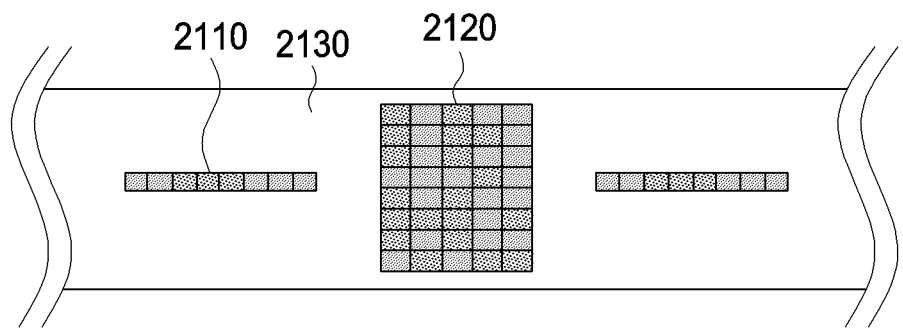
FIG. 21
| DIMENSION AND ELEMENT | 1D, TWO UNIT ELEMENTS | NUMBER OF TYPES OF INFORMATION THAT CAN BE PROVIDED | 2D, 2 × 2 UNIT ELEMENTS | NUMBER OF TYPES OF INFORMATION THAT CAN BE PROVIDED |
|---|---|---|---|---|
| COMBINATION OF UNIT INFORMATION | (N,S) | 4 | (N,S) x (N,S) | 16 |
| | (R,G,B) | 9 | (R,G,B) x (R,G,B) | 81 |
| | (N,S) x (R,G,B) | 36 | $(N,S)^2$ x $(R,G,B)^2$ | 1296 |
FIG. 22

|  | R (RED) | G (GREEN) | B (BLUE) |
|---|---|---|---|
| N-POLE | 0 | 1 | 2 |
| S-POLE | 3 | 4 | 5 |
FIG. 23
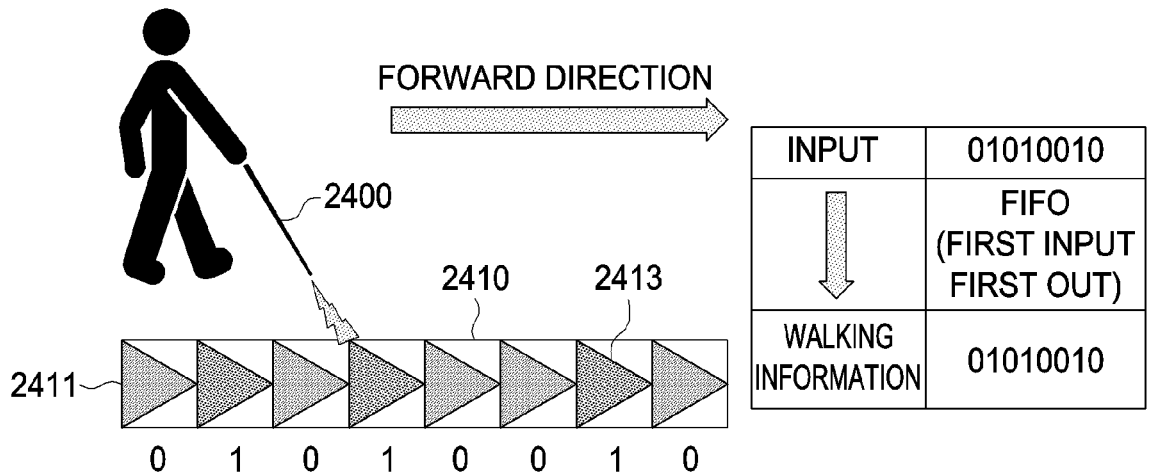
FIG. 24
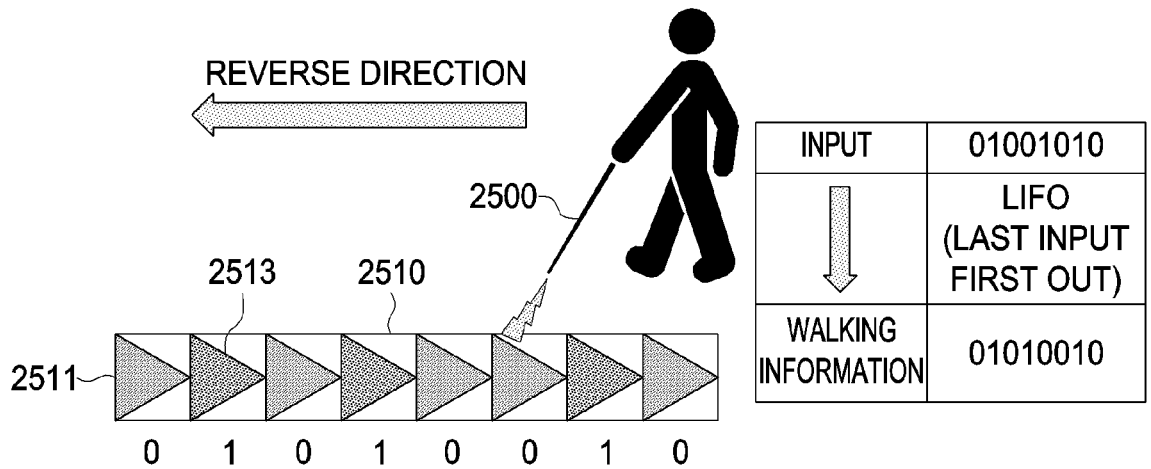
FIG. 25

METHOD AND DEVICE FOR RECOGNIZING GAIT INFORMATION USING PLURALITY OF MAGNETIC SENSORS

CROSS REFERENCE TO RELATED APPLICATION

This is a 35 U.S.C. § 371 application of, and claims priority to, International Application No. PCT/KR2021/006902, filed on Jun. 3, 2021, and claims priority to Korean Patent Application No. 10-2020-0076501, filed on Jun. 23, 2020, and to Korean Patent Application No. 10-2020-0076502, filed on Jun. 23, 2020, the teachings of which are incorporated herein by reference.

TECHNICAL FIELD

The present disclosure relates generally to a method and apparatus of recognizing walking information by using multiple magnetic sensors, and more particularly, to technology for recognizing walking information from magnetic paint applied to a ground.

The present disclosure claims the benefit of Korean Patent Applications No. 10-2020-0076501, filed Jun. 23, 2020, and No. 10-2020-0076502, filed Jun. 23, 2020, which are hereby incorporated by reference in their entireties into this application.

BACKGROUND ART

Unless otherwise indicated herein, the materials described in this section are not the prior art with regard to the claims in this application, and are not admitted to be prior art by inclusion in this section.

Visually impaired people are able to find the direction they want to go by sensing bumps in sidewalk pavers for the visually impaired using a stick.

However, the sidewalk pavers for the visually impaired have problems in that visually impaired people and normal people may slip or fall due to the bumps therein.

Also, a pedestrian on a wheelchair needs to sense the bumps in the sidewalk pavers while driving the wheelchair, which may also cause a safety problem.

Also, the sidewalk pavers for the visually impaired have a structural problem and a problem in which they can transfer very small amounts of information to visually impaired people.

The sidewalk pavers for the visually impaired transfer only information about a straight section and an intersection identified depending on the shapes of the bumps to visually impaired people, and have limitations in providing further information.

Accordingly, the need for technology that can provide visually impaired people with various kinds of information without bumps is required.

DISCLOSURE

Technical Problem

An object of the present disclosure is to accurately detect a magnetic signal from magnetic paint applied to a road (a sidewalk) using multiple magnetic sensors.

Another object of the present disclosure is to efficiently remove noise using multiple signals sensed using multiple sensors when a magnetic signal sensitive to noise is detected.

A further object of the present disclosure is to efficiently detect a magnetic signal in order to recognize a pattern for providing walking information from magnetic paint applied to a road.

Yet another object of the present disclosure is to include a magnetic pattern and/or an optical pattern in paint applied to a road (a sidewalk) and to enable pedestrians, such as visually impaired people who are walking in a road, and the like, to be provided with walking information by sensing the magnetic pattern and the optical pattern.

Still another object of the present disclosure is to apply both a magnetic pattern and an optical pattern using paint including magnetic materials, thereby storing sufficient amounts of information to provide walking information even though a region to which the paint is applied is not large.

Still another object of the present disclosure is to form a magnetic pattern or an optical pattern not only in one dimension but also in two dimensions, thereby efficiently providing walking information to pedestrians.

The objects of the present disclosure are not limited to the above objects, and it will be apparent that other objects can be derived from the following description.

Technical Solution

In order to accomplish the above objects, a method for recognizing walking information using multiple magnetic sensors according to an embodiment of the present disclosure includes generating a magnetic sensing signal from magnetic paint applied to a ground, generating a frequency-converted signal using the magnetic sensing signal, and generating walking information using the frequency-converted signal.

Here, the frequency-converted signal may be generated by generating detection signals by detecting the magnetic sensing signal at preset periods, generating average signals by averaging a preset number of detection signals, grouping the average signals in a preset conversion unit, and performing frequency conversion thereon.

Here, the magnetic sensing signal may include a first magnetic sub-signal generated from the magnetic paint through a first magnetic sensor and a second magnetic sub-signal generated from the magnetic paint through a second magnetic sensor.

Here, the frequency-converted signal may be generated using a noise-reduced signal generated using the difference between the first magnetic sub-signal and the second magnetic sub-signal.

Here, the noise-reduced signal may be generated using the differences between the average signals corresponding to the first magnetic sub-signal and the average signals corresponding to the second magnetic sub-signal.

Here, the method for recognizing walking information using multiple magnetic sensors according to an embodiment of the present disclosure may further include generating direction information of the magnetic paint using the difference between the time at which the first magnetic sub-signal is received and the time at which the second magnetic sub-signal is received.

Here, the method for recognizing walking information using multiple magnetic sensors according to an embodiment of the present disclosure may further include generating an optical sensing signal from the magnetic paint, and generating the walking information may comprise generating the walking information using any one or more of the frequency-converted signal, or the optical sensing signal, or a combination thereof.

Here, the magnetic sensing signal may correspond to a one-dimensional magnetic pattern or a two-dimensional magnetic pattern.

Here, the optical sensing signal may be configured to subdivide a magnetic pattern corresponding to the magnetic sensing signal, thereby increasing the amount of information per unit length or unit area, compared to the case in which only the magnetic sensing signal is used.

Also, in order to accomplish the above objects, an apparatus for recognizing walking information using multiple magnetic sensors according to an embodiment of the present disclosure includes a magnetic sensor for generating a magnetic sensing signal from magnetic paint applied to a ground, a frequency conversion unit for generating a frequency-converted signal using the magnetic sensing signal, and a control unit for generating walking information using the frequency-converted signal.

Here, the frequency conversion unit may generate detection signals by detecting the magnetic sensing signal at preset periods, generate average signals by averaging a preset number of detection signals, group the average signals in a preset conversion unit, and perform frequency conversion thereon, thereby generating the frequency-converted signal.

Here, the magnetic sensing signal may include a first magnetic sub-signal generated from the magnetic paint through a first magnetic sensor and a second magnetic sub-signal generated from the magnetic paint through a second magnetic sensor.

Here, the frequency-converted signal may be generated using a noise-reduced signal generated using the difference between the first magnetic sub-signal and the second magnetic sub-signal.

Here, the noise-reduced signal may be generated using the differences between the average signals corresponding to the first magnetic sub-signal and the average signals corresponding to the second magnetic sub-signal.

Here, the control unit may generate direction information of the magnetic paint using the difference between the time at which the first magnetic sub-signal is received and the time at which the second magnetic sub-signal is received.

Here, the apparatus for recognizing walking information using multiple magnetic sensors according to an embodiment of the present disclosure may further include an optical sensor for generating an optical sensing signal from the magnetic paint, and the control unit may generate walking information using any one or more of the frequency-converted signal, or the optical sensing signal, or a combination thereof.

Here, the magnetic sensing signal may correspond to a one-dimensional magnetic pattern or a two-dimensional magnetic pattern.

Here, the optical sensing signal may be configured to subdivide a magnetic pattern corresponding to the magnetic sensing signal, thereby increasing the amount of information per unit length or unit area, compared to the case in which only the magnetic sensing signal is used.

In order to accomplish the above objects, a method for recognizing walking information using magnetic/optical patterns according to an embodiment of the present disclosure includes generating magnetic sensing information from magnetic paint applied to a ground through a magnetic sensor, generating optical sensing information from the magnetic paint through an optical sensor, generating walking information using any one or more of the magnetic sensing information, or the optical sensing information, or a combination thereof, and providing user information corresponding to the walking information.

Here, the magnetic sensing information may correspond to a one-dimensional magnetic pattern or a two-dimensional magnetic pattern.

Here, the optical sensing information may be configured to subdivide a magnetic pattern corresponding to the magnetic sensing information, thereby increasing the amount of information per unit length or unit area, compared to the case in which only the magnetic sensing information is used.

Here, in the method for recognizing walking information using magnetic/optical patterns according to an embodiment of the present disclosure, a method used for generating the walking information from the magnetic sensing information may vary depending on the optical sensing information.

Here, the walking information may be generated using user terminal sensor information in addition to the magnetic sensing information and the optical sensing information.

Here, the user terminal sensor information may be used for correction of any one or more of the magnetic sensing information, or the optical sensing information, or a combination thereof.

Here, the magnetic sensing information may be used for control of the optical sensor.

Also, in order to accomplish the above objects, an apparatus for recognizing walking information using magnetic/optical patterns according to an embodiment of the present disclosure may include a magnetic sensor for generating magnetic sensing information from magnetic paint applied to a ground, an optical sensor for generating optical sensing information from the magnetic paint, and a control unit for generating walking information using any one or more of the magnetic sensing information, or the optical sensing information, or a combination thereof and providing user information corresponding to the walking information.

Here, the magnetic sensing information may correspond to a one-dimensional magnetic pattern or a two-dimensional magnetic pattern.

Here, the optical sensing information may be configured to subdivide a magnetic pattern corresponding to the magnetic sensing information, thereby increasing the amount of information per unit length or unit area, compared to the case in which only the magnetic sensing information is used.

Here, in the apparatus for recognizing walking information using magnetic/optical patterns according to an embodiment of the present disclosure, a method used for generating the walking information from the magnetic sensing information may vary depending on the optical sensing information.

Here, the walking information may be generated using user terminal sensor information in addition to the magnetic sensing information and the optical sensing information.

Here, the user terminal sensor information may be used for correction of any one or more of the magnetic sensing information, or the optical sensing information, or a combination thereof.

Here, the magnetic sensing information may be used for control of the optical sensor.

Advantageous Effects

According to the present disclosure, a magnetic signal from magnetic paint applied to a road (a sidewalk) may be accurately detected using multiple magnetic sensors.

Also, according to the present disclosure, when a magnetic signal sensitive to noise is detected, noise may be efficiently removed using multiple signals sensed using multiple sensors.

Also, according to the present disclosure, a magnetic signal may be efficiently detected in order to recognize a pattern for providing walking information from magnetic paint applied to a road.

Also, according to the present disclosure, paint applied to a road (a sidewalk) may include a magnetic pattern and/or an optical pattern, and pedestrians, such as visually impaired people who are walking in a road, and the like, may be provided with walking information by sensing the magnetic pattern and the optical pattern.

Also, according to the present disclosure, both a magnetic pattern and an optical pattern are applied using paint including magnetic materials, whereby sufficient amounts of information to provide walking information may be stored even though a region to which the paint is applied is not large.

Also, according to the present disclosure, a magnetic pattern or an optical pattern is formed not only in one dimension but also in two dimensions, whereby walking information may be efficiently provided to pedestrians.

The effects of the present embodiments are not limited to the above-mentioned effects, and other effects that have not been mentioned can be clearly understood by those skilled in the art from the appended claims.

DESCRIPTION OF DRAWINGS

FIG. 20 is a use-case view of an apparatus for recognizing walking information using magnetic/optical patterns according to an embodiment of the present disclosure.

FIG. 21 is an exemplary view illustrating the pattern of magnetic paint applied to a ground according to the present disclosure.

FIG. 22 is a table illustrating a signal for unit information provided to the pattern of magnetic paint.

FIG. 23 is a table illustrating an example of a base-6 number system generated through a complex pattern.

FIG. 24 is an exemplary view of generation of walking information when walking in a forward direction.

FIG. 25 is an exemplary view of generation of walking information when walking in a reverse direction.

BEST MODE

Figure 1:
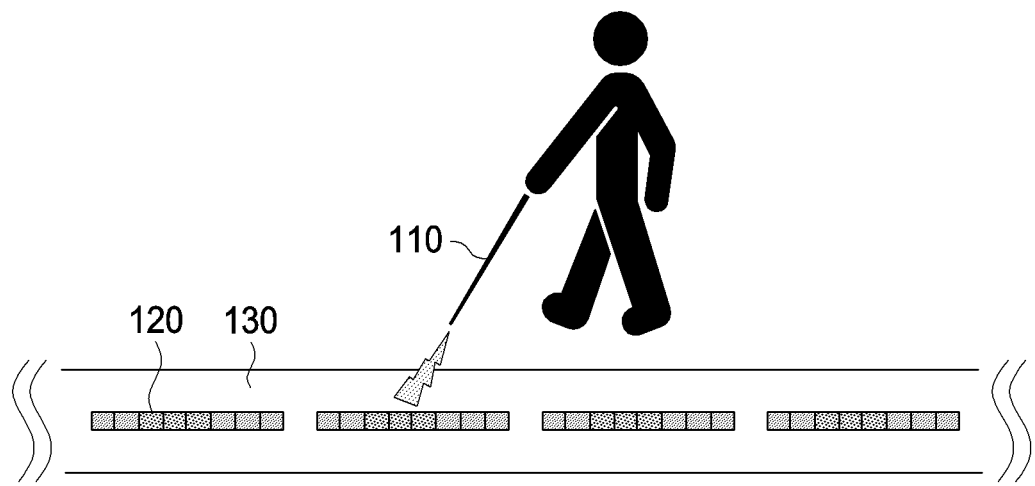
FIG. 1 is a use-case view of a walking information recognition apparatus according to an embodiment of the present disclosure.

The present disclosure will be described in detail below with reference to the accompanying drawings. Repeated descriptions and descriptions of known functions and configurations which have been deemed to unnecessarily obscure the gist of the present disclosure will be omitted below. The embodiments of the present disclosure are intended to fully describe the present disclosure to a person having ordinary knowledge in the art to which the present disclosure pertains. Accordingly, the shapes, sizes, etc. of components in the drawings may be exaggerated in order to make the description clearer.

According to an embodiment of the present disclosure, magnetic information or optical information is recorded as a one-dimensional or two-dimensional pattern by applying magnetic paint or multiple colors of paint to commonly-used sidewalk pavers having no bumps, rather than using bumpy sidewalk pavers for the visually impaired, and the magnetic information or the optical information is read using a magnetic sensor or an optical sensor, whereby walking information may be provided not only to visually impaired people but also to normal people.

Also, according to an embodiment of the present disclosure, both a one-dimensional pattern and a two-dimensional pattern are applied to sidewalk pavers, and magnetic information and optical information of each of the patterns may be detected and used to complement each other, whereby the effect of noticeably reducing malfunction of sensors for sensing the respective pieces of information may be provided.

Here, the provided walking information may be information related to the location of the pattern and a movement direction and various kinds of information that a constructor intends to transfer.

Accordingly, an embodiment of the present disclosure may use a magnetic field detection element for recognizing the above-mentioned information and an optical detection element (a color detection element) for identifying color in combination with each other, and may visually or audibly transfer further information to pedestrians by interworking with a user terminal such as a mobile electronic communication device.

The above-described embodiment may be practiced by applying color paint having magnetic information and optical information to a ground, or the like, without limitation to sidewalk pavers, and may also be applied to a mobile object that is moving using the information and a system for operating the same.

Also, an embodiment of the present disclosure includes one or more magnetic sensors for recognizing the magnetic pattern, thereby generating a noise-reduced signal using the difference between signals input to the respective magnetic sensors and detecting magnetic information using the noise-reduced signal.

Hereinafter, a preferred embodiment of the present disclosure will be described in detail with reference to the accompanying drawings.

FIG. 1 is a use-case view of a walking information recognition apparatus according to an embodiment of the present disclosure.

Referring to FIG. 1, the walking information recognition apparatus 110 according to an embodiment of the present disclosure is made in the form of a stick such that a user (a pedestrian or the like) is able to carry the same when walking, and may be configured to recognize information stored in magnetic paint 120 applied to a ground 130.

Here, the magnetic paint 120 may form a specific pattern using magnetic properties, and may alternatively form a specific pattern using optical properties that differ in color.

Here, the walking information recognition apparatus 110 according to an embodiment of the present disclosure may read the specific pattern of the magnetic paint 120 applied to the ground, recognize walking information included in the specific pattern, and provide the walking information to a user.

Here, the walking information may include all kinds of information necessary for walking, such as the current location, nearby buildings, tourist spot information, a sidewalk range, and the like.

Figure 2:
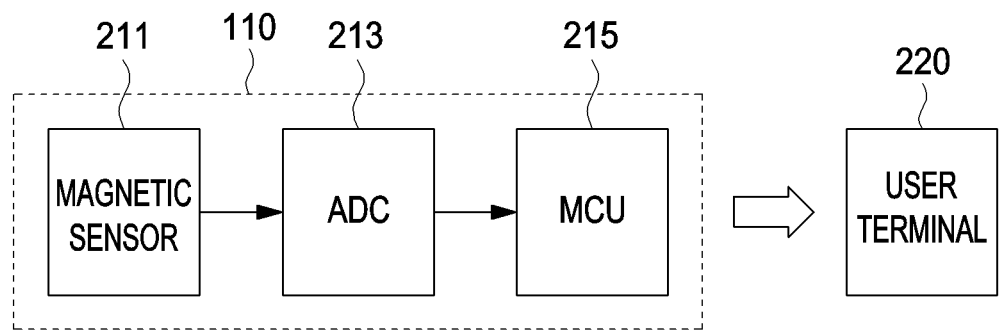
FIG. 2 is a block diagram of a walking information recognition apparatus according to an embodiment of the present disclosure.

FIG. 2 is a block diagram of a walking information recognition apparatus according to an embodiment of the present disclosure.

Referring to FIG. 2, the walking information recognition apparatus 110 according to an embodiment of the present disclosure may include a magnetic sensor 211, an Analog-Digital Converter (ADC) 213, a processor (e.g., an MCU, a MICOM, or the like) 215, and the like.

Here, the walking information recognition apparatus 110 according to an embodiment of the present disclosure may generate walking information from magnetic paint applied to a ground, and may provide the walking information to a user terminal 220 through wired or wireless communication.

Here, the magnetic sensor 211 may detect a magnetic signal from the magnetic paint applied to the ground.

Here, because the magnetic signal may be an analog signal, it may be converted into a digital signal through the analog-digital converter 213, as will be described later.

Here, the magnetic sensor 211 may also detect a noise signal due to the earth's magnetic field or an environment in which a magnetic field is generated or induced from nearby iron, or the like. Accordingly, the magnetic sensor may use a magnetic sensor configured to detect a dynamic signal rather than a static signal.

The magnetic sensor configured to detect a dynamic signal is not able to detect a signal when it is stationary on the magnetic paint in which magnetic information is recorded, and is able to detect a signal only when it is moving. That is, a sensor capable of detecting a change in a magnetic signal over time may be used.

Here, the analog-digital converter 213 may convert the analog signal detected using the magnetic sensor 211 into a digital signal such that the processor 215 is able to process the signal.

Here, the analog-digital converter 213 may be an ADC having the resolution of 12 bits or higher and a sampling rate equal to or greater than 1 kS/s.

Here, the processor 215 may generate walking information by processing the digital signal converted through the analog-digital converter 213.

More specifically, the processor 215 performs Fast Fourier Transform (FFT) on the digital signal, thereby extracting a period of the pattern recorded in the magnetic paint, that is, a frequency.

Here, the processor 215 may generate the walking information based on the frequency and transfer the same to the user terminal 220, and it is desirable to transfer the walking information analyzed through fast Fourier transform to the user terminal 220 within one second from signal detection.

Here, a communication method for transferring the walking information may be a short-range wireless communication method, such as Wi-Fi, near-field communication (NFC), Bluetooth, or the like, or the walking information may be communicated in a wired manner.

Here, the walking information may be converted into a tactile (e.g., vibration) or auditory (e.g., sound) signal through the user terminal 220 and provided to a user, and may be visually provided through the display of the user terminal 220.

As described above, the reason for varying the provision method is to increase the transfer efficiency and the amount of information provided to the user within the same amount of time.

Figure 3:
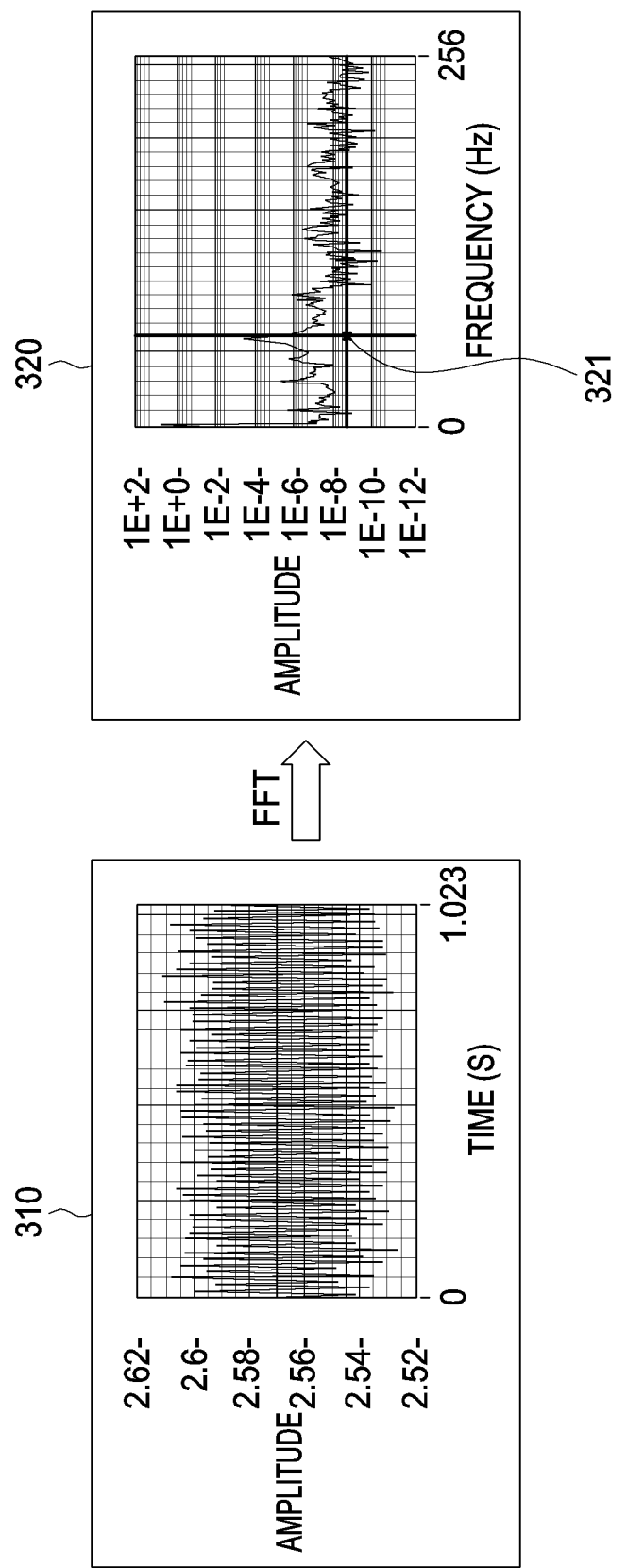
FIG. 3 is a graph illustrating a process of generating a frequency-converted signal according to an embodiment of the present disclosure.

FIG. 3 is a graph illustrating a process of generating a frequency-converted signal according to an embodiment of the present disclosure.

Referring to FIG. 3, the left graph 310 is a graph of an alternating magnetic pattern that is measured by reading the same into Field-Programmable Gate Arrays (FPGAs) using a magnetic sensor after the alternating magnetic paint corresponding to 60 Hz is constructed.

Here, when a signal acquired from a single analog magnetic sensor is detected through the FPGAs every 5 microseconds (is) and when the average of 200 detected signals is taken as a single signal, the left graph 310 is a graph illustrating 1,024 signals that are collected for 1,024 seconds.

Here, the span between the minimum strength and the maximum strength (amplitude) in the left graph 310 may vary within a signal of about 100 mV (about 2.52 V~2.62 V).

The right graph 320 is a graph of the result of fast Fourier transform performed on the 1,024 signals, and it can be seen that, when the alternating magnetic pattern is drawn so as to correspond to 60 Hz and when the signal detected through the magnetic sensor is converted, the signal 321 of 60 Hz is clearly differentiated from other signals, whereby walking information, and the like may be provided using the magnetic pattern signal. That is, because a magnetic signal has characteristics in which it is very sensitive to noise and in which the measurement value thereof varies a lot depending on various kinds of noise, when the magnetic signal is not efficiently measured, it is difficult to acquire desired walking information from the magnetic signal measured from the applied magnetic paint. Therefore, the average is calculated after collecting a sufficient number of detected signals, and frequency conversion is performed after collecting the calculated average values, whereby it becomes possible to detect a desired frequency pattern from the magnetic paint applied to the ground.

However, when a magnetic signal is detected using a single magnetic sensor, there may be a lack of means for reducing noise. Therefore, as will be described later, noise is reduced using multiple magnetic sensors, whereby a frequency corresponding to the alternating magnetic pattern may be more clearly detected.

Figure 4:
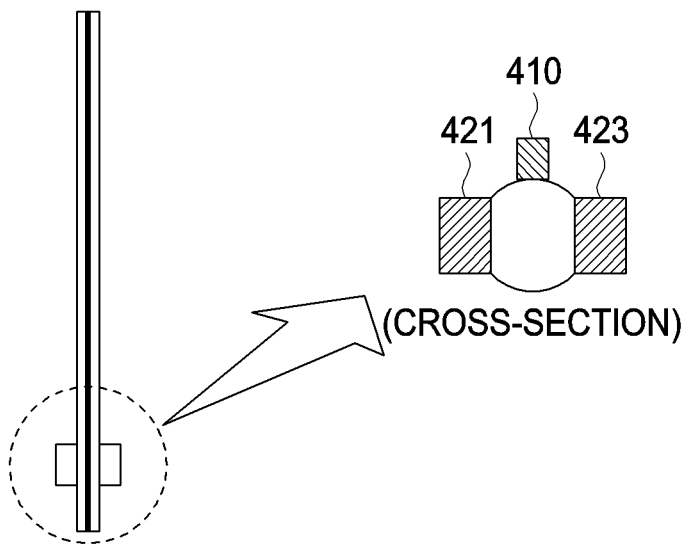
FIG. 4 and FIG. 5 are structural diagrams of a walking information recognition apparatus including multiple magnetic sensors according to an embodiment of the present disclosure.
Figure 5:
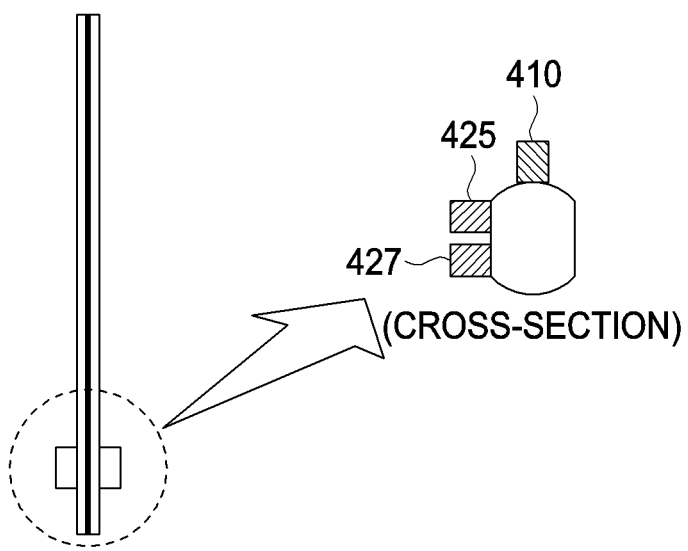

FIG. 4 and FIG. 5 are structural diagrams of a walking information recognition apparatus including multiple magnetic sensors according to an embodiment of the present disclosure.

Referring to FIG. 4, the walking information recognition apparatus 110 according to an embodiment of the present disclosure is made in the form of a stick such that a user (a pedestrian or the like) is able to carry the same when walking, and may include two magnetic sensors 421 and 423 capable of detecting magnetic signals on the left and right sides of the stick and a center marker 410 through which the center of the stick can be identified.

Here, the first magnetic sensor 421 for detecting a magnetic signal on the left side of the stick based on the center marker 410 and the second magnetic sensor 423 for detecting a magnetic signal on the right side of the stick based on the center marker 410 may be located in the stick so as to be spaced apart from each other.

Meanwhile, referring to FIG. 5, the walking information recognition apparatus 110 according to an embodiment of the present disclosure may be configured such that two magnetic sensors 425 and 427 capable of detecting a magnetic signal are integrated on one side of the stick, and may include a center marker 410 through which the center of the stick can be identified.

Here, the walking information recognition apparatus 110 including two magnetic sensors 421 and 423 or 425 and 427 according to an embodiment of the present disclosure may reduce noise using a time difference between magnetic signals detected by the respective magnetic sensors, as will be described later. Also, noise may be reduced by subtracting the magnetic signals detected by the respective magnetic sensors from each other.

Figure 6:
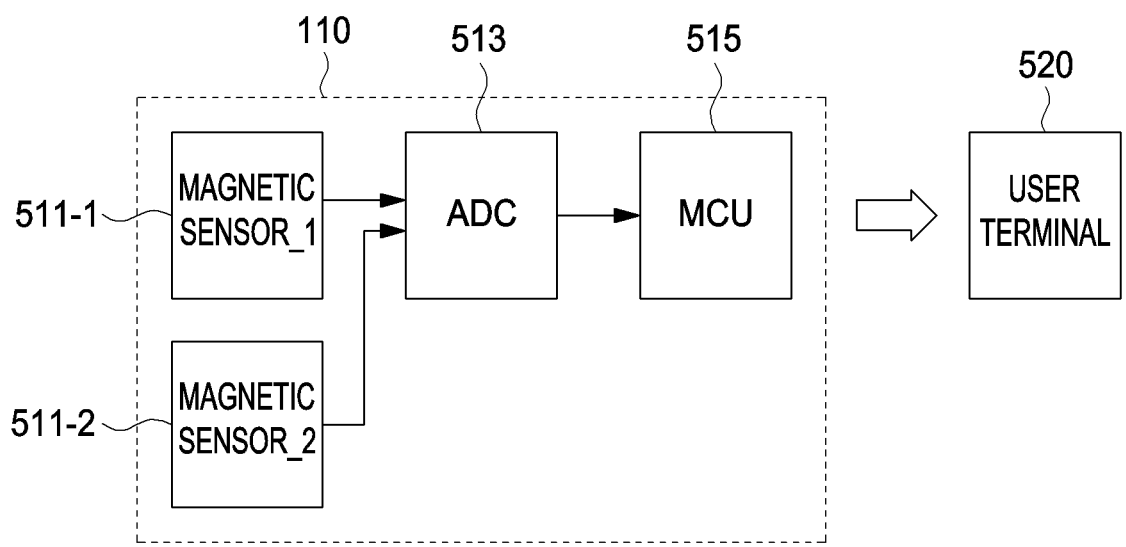
FIG. 6 is a block diagram of a walking information recognition apparatus including multiple magnetic sensors according to an embodiment of the present disclosure.

FIG. 6 is a block diagram of a walking information recognition apparatus including multiple magnetic sensors according to an embodiment of the present disclosure.

Referring to FIG. 6, the walking information recognition apparatus 110 according to an embodiment of the present disclosure may include a first magnetic sensor 511-1, a second magnetic sensor 511-2, an Analog-Digital Converter (ADC) 513, a processor (e.g., an MCU, a MICOM, or the like) 515, and the like.

Here, the walking information recognition apparatus 110 according to an embodiment of the present disclosure may generate walking information from magnetic paint applied to a ground, as in an embodiment including a single magnetic sensor, and may provide the walking information to a user terminal 520 through wired or wireless communication.

Here, the first magnetic sensor 511-1 and the second magnetic sensor 511-2 may detect a magnetic signal from the magnetic paint applied to the ground, in which case they may detect the same magnetic signal from the same magnetic paint at different times.

Here, because the magnetic signal may be an analog signal, it may be converted into a digital signal through the analog-digital converter, as will be described later.

Here, the magnetic sensors 511-1 and 511-2 may also detect a noise signal generated due to the earth's magnetic field or generated in an environment in which a magnetic field is generated or induced from nearby iron, or the like. Therefore, the magnetic sensor may use a magnetic sensor configured to detect a dynamic signal rather than a static signal.

The magnetic sensor configured to detect a dynamic signal is not able to detect a signal when it is stationary on the magnetic paint in which magnetic information is recorded, and is able to detect a signal only when it is moving. That is, a sensor capable of detecting a change in a magnetic signal over time may be used.

Here, the analog-digital converter 513 may convert the analog magnetic signal detected using the first magnetic sensor 511-1 and the second magnetic sensor 511-2 into a digital signal such that the processor 515 is able to process the signal.

Here, the analog magnetic signal detected using the first magnetic sensor 511-1 and the second magnetic sensor 511-2 may be the difference between the respective analog magnetic signals detected using the first magnetic sensor 511-1 and the second magnetic sensor 511-2, and it will be described in more detail later with reference to FIG. 6.

Here, the analog-digital converter 513 may be an ADC having the resolution of 12 bits or higher and a sampling rate equal to or greater than 1 kS/s.

Here, the processor 515 may generate walking information by processing the digital signal converted through the analog-digital converter 513.

More specifically, the processor 515 performs Fast Fourier Transform (FFT) on the digital signal, thereby extracting a period of the pattern recorded in the magnetic paint, that is, a frequency.

Here, the processor 515 may generate the walking information based on the frequency and transfer the same to the user terminal 520, and it is desirable to transfer the walking information analyzed through fast Fourier transform to the user terminal 520 within one second from signal detection.

Here, a communication method for transferring the walking information may be a short-range wireless communication method, such as Wi-Fi, near-field communication (NFC), Bluetooth, or the like, or the walking information may be communicated in a wired manner.

Here, the walking information may be converted into a tactile (e.g., vibration) or auditory (e.g., sound) signal through the user terminal 520 and provided to a user, and may be visually provided through the display of the user terminal 520.

As described above, the reason for varying the provision method is to increase the transfer efficiency and the amount of information provided to the user within the same amount of time.

Figure 7:
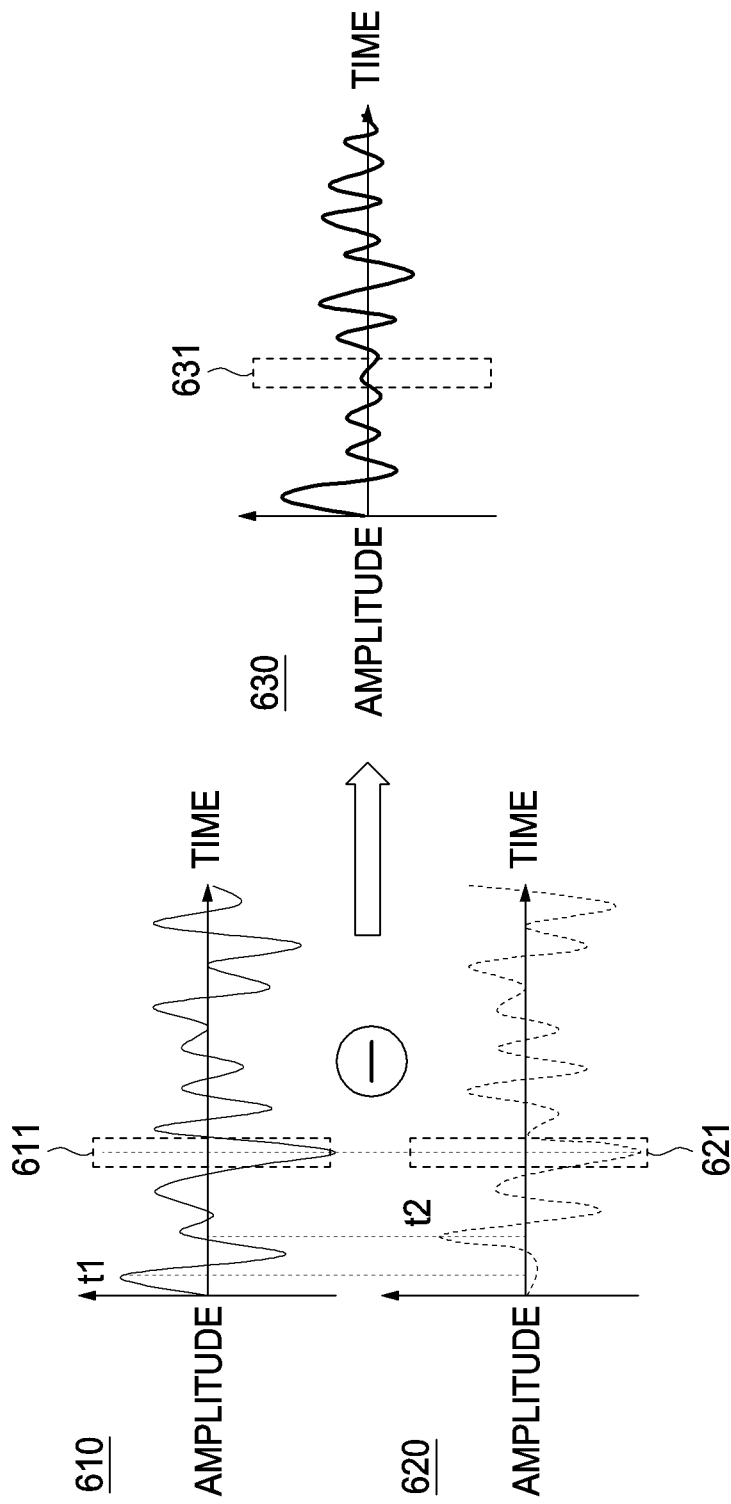
FIG. 7 is a graph illustrating a process of generating a noise-reduced signal according to an embodiment of the present disclosure.

FIG. 7 is a graph illustrating a process of generating a noise-reduced signal according to an embodiment of the present disclosure.

Referring to FIG. 7, the walking information recognition apparatus including two magnetic sensors according to an embodiment of the present disclosure may detect the same magnetic signal at different times.

For example, when the source of the magnetic signal is closer to a first magnetic sensor than a second magnetic sensor, a first magnetic sub-signal 610, which is detected through the first magnetic sensor, may be detected t2-t1 earlier than a second magnetic sub-signal 620, which is detected through the second magnetic sensor.

However, the noise signal 611 detected by the first magnetic sensor and the noise signal 621 detected by the second magnetic sensor are input in the same time window without a time difference.

Accordingly, a noise-reduced signal 630 from which the noise signal 631 is removed may be generated by calculating the difference between the first magnetic sub-signal 610 and the second magnetic sub-signal 620, whereby the frequency recorded in the magnetic paint may be more clearly extracted.

Here, the noise-reduced signal 630 may alternatively be the differences between the average signals corresponding to the first magnetic sub-signal 610 and the average signals corresponding to the second magnetic sub-signal 620.

Also, the walking information recognition apparatus according to an embodiment of the present disclosure may be configured such that two magnetic sensors 425 and 427 for respectively detecting magnetic fields in different directions are integrated therein, as illustrated in FIG. 5.

More specifically, any one of the two magnetic sensors (425 or 427) may be installed in the walking information recognition apparatus 110 in the direction in which a magnetic field in a vertical direction can be detected, and the other magnetic sensor 427 or 425 may be installed in the walking information recognition apparatus 110 in the direction in which a magnetic field in a horizontal direction can be detected.

Here, when the magnetic field in the vertical direction coming from the paint with which a magnetic pattern is built has the greatest strength, a magnetic signal in the horizontal direction has a relatively small strength.

Here, the walking information recognition apparatus according to an embodiment of the present disclosure may integrate the first and second magnetic sensors therein such that the first magnetic sensor 425 detects a first magnetic sub-signal corresponding to a vertical magnetic field and such that the second magnetic sensor 427 detects a second magnetic sub-signal corresponding to a horizontal magnetic field.

Here, the walking information recognition apparatus according to an embodiment of the present disclosure may reduce a noise signal generated in the vicinity thereof by applying the above-described method to the two signals, whereby a signal intended to be detected in the paint may be more clearly read.

Meanwhile, this method may also be the above-mentioned method of using the detection time difference between two sensors.

Figure 8:
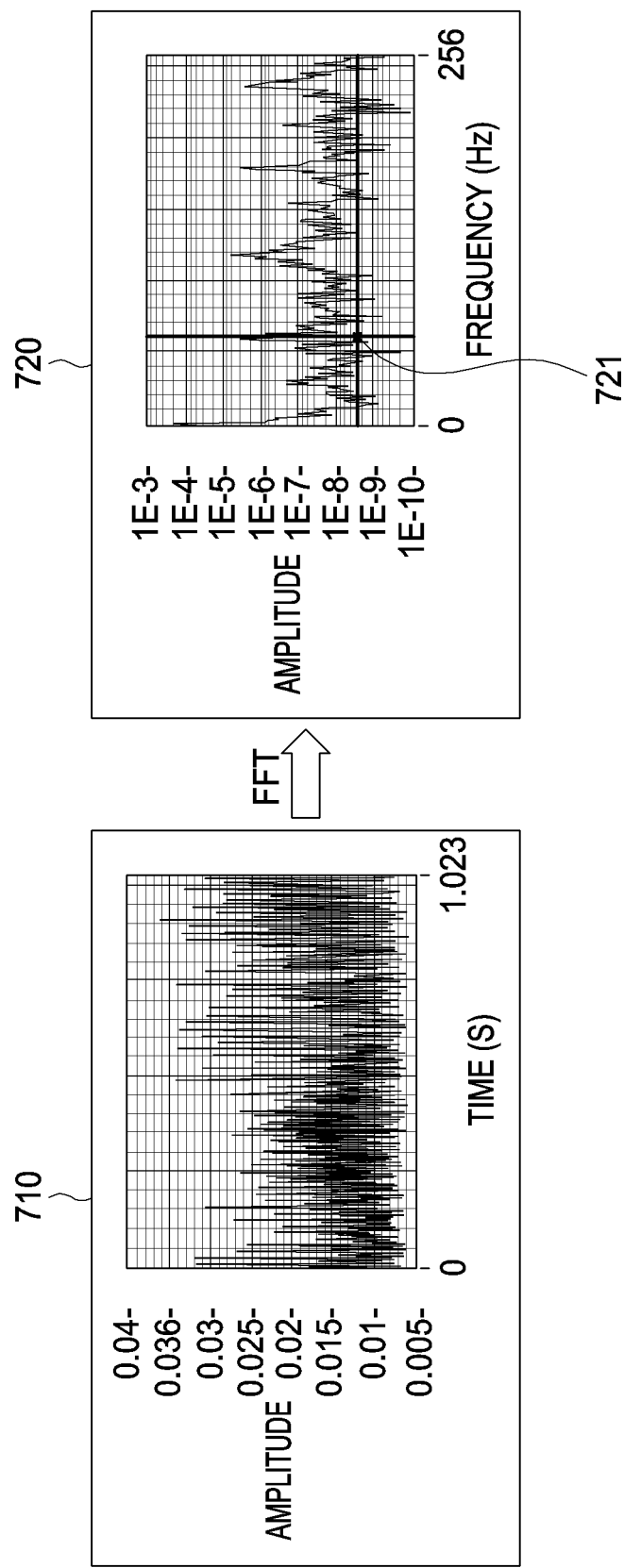
FIG. 8 is a graph illustrating a process of generating a frequency-converted signal using a noise-reduced signal according to an embodiment of the present disclosure.

FIG. 8 is a graph illustrating a process of generating a frequency-converted signal using a noise-reduced signal according to an embodiment of the present disclosure.

Referring to FIG. 8, the left graph 710 is a graph illustrating a noise-reduced signal, which is the difference between a first magnetic sub-signal and a second magnetic sub-signal detected using a first magnetic sensor and a second magnetic sensor after an alternating magnetic pattern corresponding to 60 Hz is constructed, as in FIG. 3.

When two magnetic sensors are used, as described above, noise may be reduced and the frequency recorded in magnetic paint may be more clearly extracted.

Here, when the difference between the first magnetic sub-signal and the second magnetic sub-signal is detected through FPGAs every 5 μs and when the average of 200 detected signals is taken as a single signal, the left graph 710 may be a graph illustrating 1,024 signals that are collected for 1,024 seconds.

Alternatively, when each of the first magnetic sub-signal and the second magnetic sub-signal is detected through FPGAs every 5 μs and when the average of 200 detected signals is calculated for each of the first magnetic sub-signal and the second magnetic sub-signal, the left graph 710 may be a graph illustrating 1,024 signals acquired by collecting the differences between the respective averages for 1,024 seconds.

Here, the span between the minimum strength and the maximum strength (amplitude) in the left graph 710 may vary within a signal of about 35 mV (0.005 V~0.04 V), and may be about three times less than the amplitude (2.62 V−2.52 V=100 mV) in the case in which detection is performed using a single magnetic sensor.

The right graph 720 is a graph of a result of fast Fourier transform performed on the 1,024 signals and is the case in which the alternating magnetic pattern that is drawn so as to correspond to 60 Hz is detected, and it can be seen that the magnetic pattern 721 of 60 Hz may be clearly identified because harmonics of 60 Hz, such as 60 Hz, 120 Hz, 180 Hz, and the like, appear well as the result of conversion of the noise-reduced signal.

Figure 9:
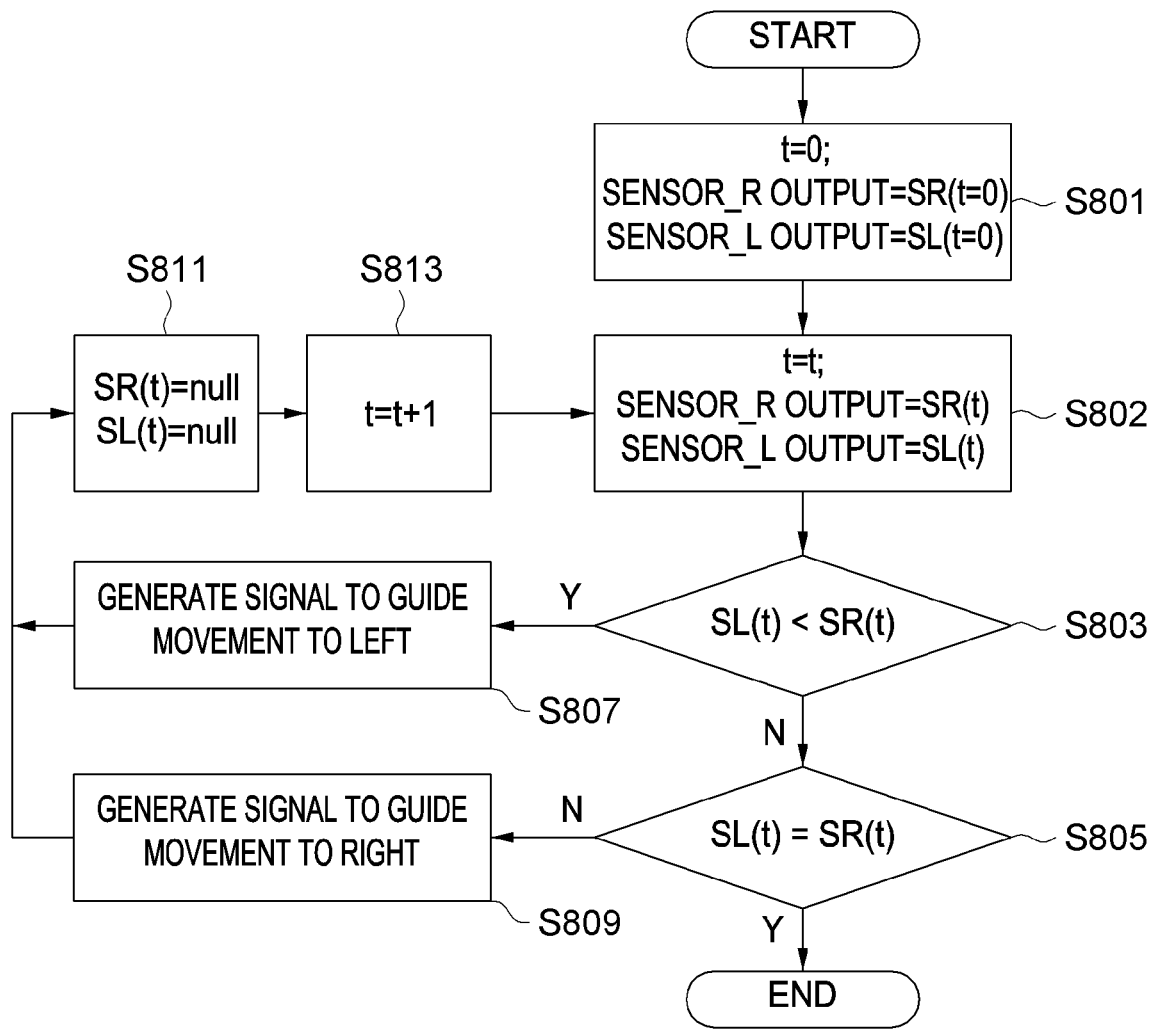
FIG. 9 is a flowchart of generation of a pedestrian guidance signal according to an embodiment of the present disclosure.

FIG. 9 is a flowchart of generation of a pedestrian guidance signal according to an embodiment of the present disclosure.

According to an embodiment of the present disclosure, two magnetic sensors are installed at different locations in a walking information recognition apparatus, and one or more kinds of magnetic paint applied to a ground may be identified using relative signals detected by the two sensors.

Also, an embodiment of the present disclosure may draw one or more lines on the ground with magnetic paint, and may guide a user or a moving object, such as a wheelchair or the like, to the center between the lines.

Here, in the method of generating a guidance signal according to an embodiment of the present disclosure, first, 0 is substituted into the variable 't', and the output of a first magnetic sensor, which is located on the right side of the walking information recognition apparatus according to an embodiment of the present disclosure, and the output of a second magnetic sensor, which is located on the left side thereof, may be respectively defined as and initialized to SR(t=0) and SL(t=0) at step S801.

Here, the variable 't' may correspond to time, and SR(t) and SL(t) may correspond to the outputs of the respective magnetic sensors, which change over time.

Also, in the method of generating a guidance signal according to an embodiment of the present disclosure, SR(t) and SL(t) changing over time are defined to correspond to the time at step S802, and SR(t) and SL(t) may be compared with each other at step S803.

Here, in the method of generating a guidance signal according to an embodiment of the present disclosure, when SR(t) is greater than SL(t), a signal may be generated to guide movement to the left at step S807, whereas when SR(t) is not greater than SL(t), whether SR(t) and SL(t) are equal to each other may be checked at step S805.

Here, in the method of generating a guidance signal according to an embodiment of the present disclosure, when SL(t) is equal to SR(t), the above steps are repeated by going back to the start, whereas when SL(t) is not equal to SR(t), a signal may be generated to guide movement to the right at step S809.

Here, in the method of generating a guidance signal according to an embodiment of the present disclosure, after a signal is generated to guide movement to the left or right, null is substituted into each of SR(t) and SL(t) at step S811, t+1 is substituted into t, and the process may be performed again from step S802 in order to again determine the current location of a user.

Accordingly, the method of generating a guidance signal according to an embodiment of the present disclosure repeatedly performs the above-described steps, thereby inducing a user or a moving object to walk or move in the center between the lines.

Figure 10:
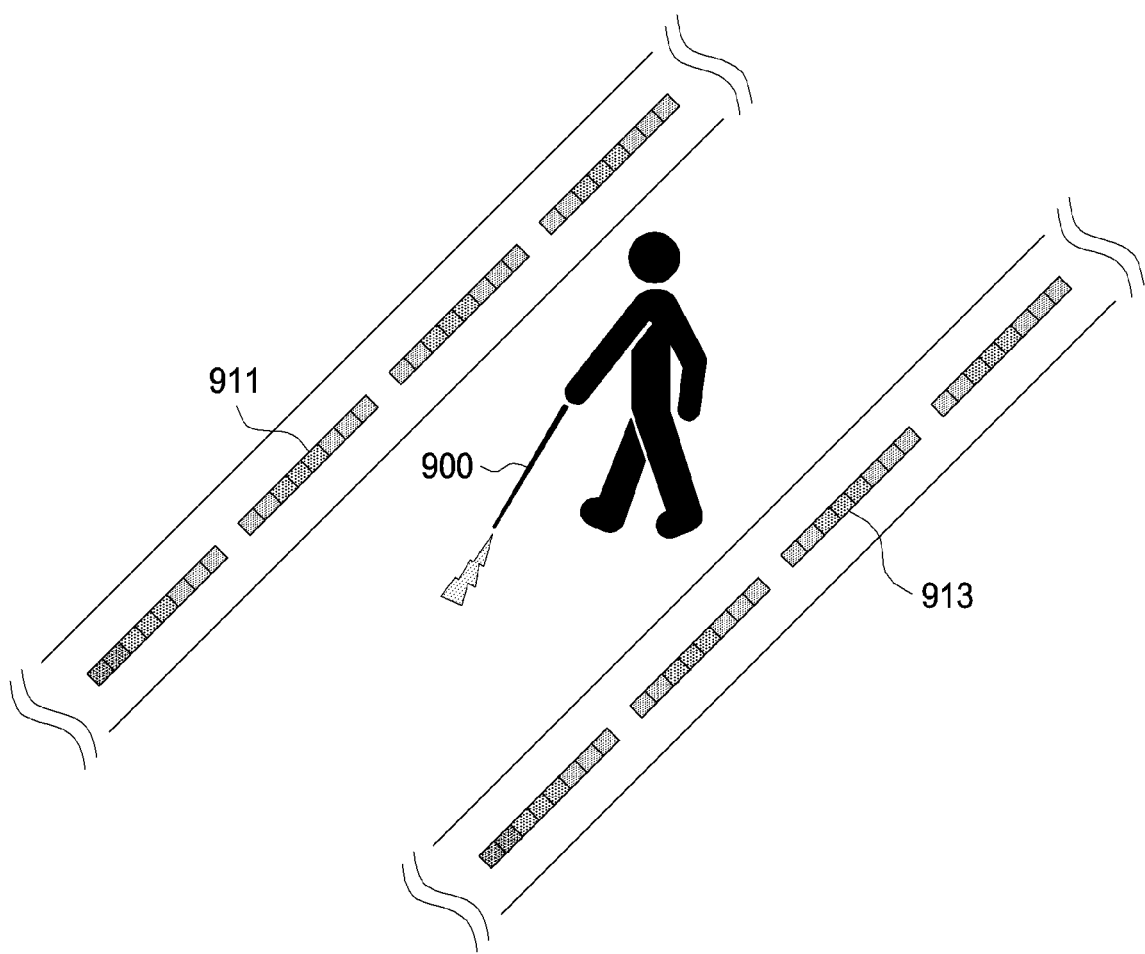
FIG. 10 is a use-case view of application of multiple magnetic patterns according to an embodiment of the present disclosure.

FIG. 10 is a use-case view of application of multiple magnetic patterns according to an embodiment of the present disclosure.

Referring to FIG. 10, two or more magnetic patterns 911 and 913 according to an embodiment of the present disclosure may be applied on both sides of a sidewalk.

Here, the first magnetic pattern 911 and the second magnetic pattern 913 applied on both sides of the sidewalk are formed to have the same pattern based on one direction, whereby a user carrying a walking information recognition apparatus 900 according to an embodiment of the present disclosure may be provided with the same magnetic sensing information.

Alternatively, based on keeping to the right, the first magnetic pattern 911 located on the right side of a pedestrian is formed to have a forward magnetic pattern, and the second magnetic pattern 913 located on the left side of the pedestrian is formed to have a reverse pattern of the first magnetic pattern 911, whereby fixed walking information is provided regardless of the direction in which the pedestrian is moving or different magnetic patterns may be formed to include different pieces of information depending on the movement direction.

Here, the location of the user who carries the walking information recognition apparatus 900 according to an embodiment of the present disclosure may be detected using the strength of a magnetic field by the first magnetic pattern 911 and the second magnetic pattern 913, and a detailed description thereof will be made later with reference to FIG. 10.

Also, the above-described magnetic patterns 911 and 913 may be formed on both sides of a passage, thereby serving as lanes along which vehicles, wheelchairs, and the like are capable of moving.

Figure 11:
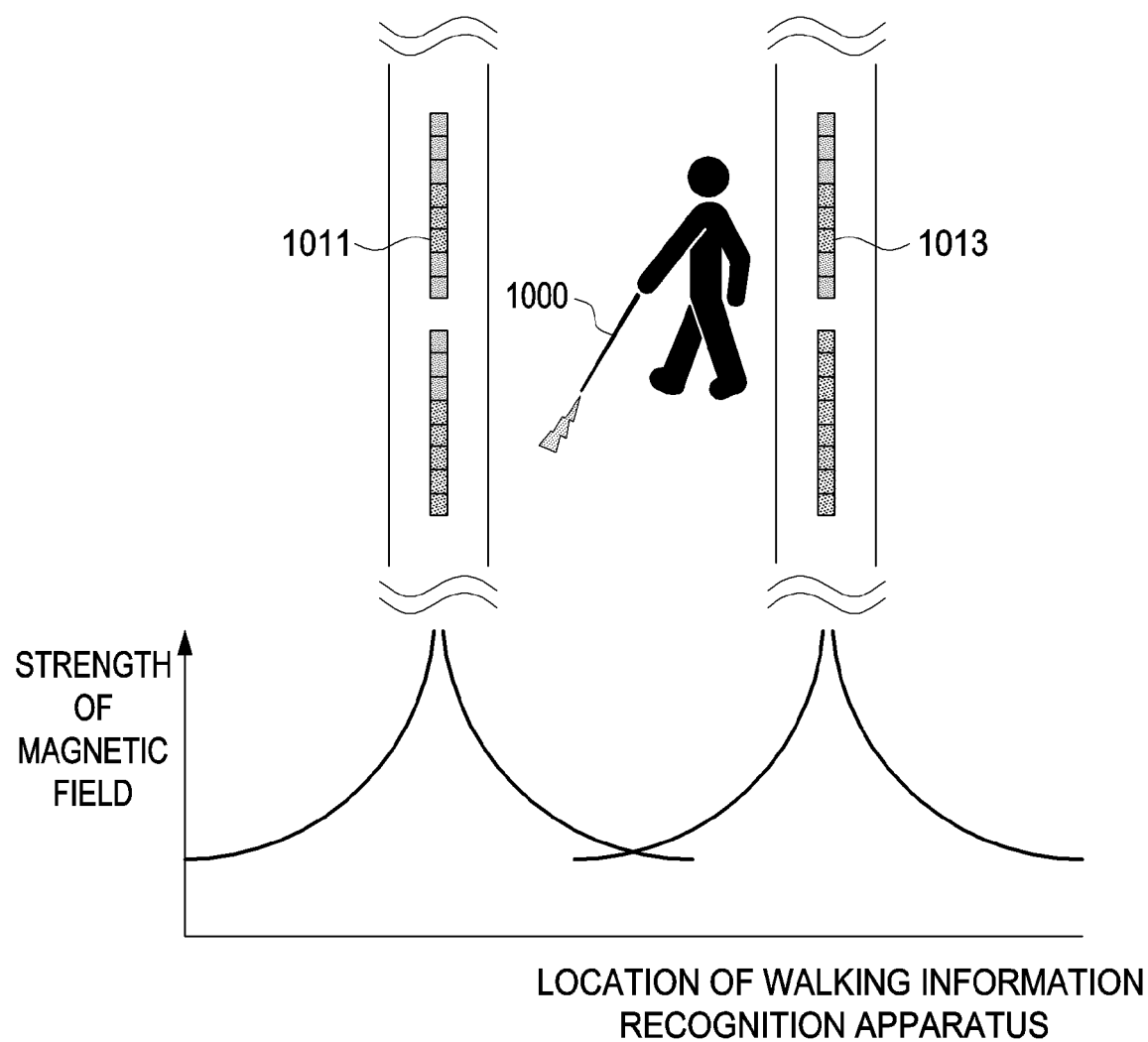
FIG. 11 is a graph illustrating the strength of a magnetic field depending on multiple magnetic patterns and the location of a walking information recognition apparatus.

FIG. 11 is a graph illustrating the strength of a magnetic field depending on multiple magnetic patterns and the location of a walking information recognition apparatus.

Referring to FIG. 11, the strengths of magnetic fields by a first magnetic pattern 1011 and a second magnetic pattern 1013 may vary depending on the location of a walking information recognition apparatus 1000 located between the first magnetic pattern 1011 and the second magnetic pattern 1013.

Here, when the walking information recognition apparatus 1000 according to an embodiment of the present disclosure comes closer to the first magnetic pattern 1011, the strength of the magnetic field by the first magnetic pattern 1011 increases, whereas when it comes closer to the second magnetic pattern 1013, the strength of the magnetic field by the second magnetic pattern 1013 increases, so a user carrying the walking information recognition apparatus 1000 according to an embodiment of the present disclosure may detect his or her location in the sidewalk.

Also, using the strength of the magnetic field by each of the magnetic patterns 1011 and 1013, the user may be prevented from walking in a roadway or a dangerous area and may be guided to a safe path.

Here, the walking information recognition apparatus 1000 according to an embodiment of the present disclosure may include two magnetic sensors, thereby inducing the user to move to the center of the sidewalk, as described above.

Figure 12:
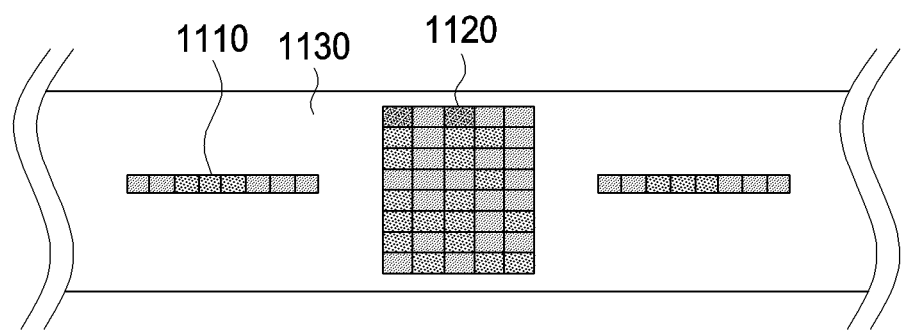
FIG. 12 is an exemplary view illustrating the pattern of magnetic paint applied to a ground according to the present disclosure.

FIG. 12 is an exemplary view illustrating the pattern of magnetic paint applied to a ground according to the present disclosure.

Conventional sidewalk pavers for the visually impaired may simply provide only direction information, but a pattern or an alternating pattern may be drawn with magnetic paint according to an embodiment of the present disclosure, whereby location information and various kinds of other information may be provided as well as the direction information.

Referring to FIG. 12, the pattern of magnetic paint applied to a ground 1130 according to an embodiment of the present disclosure may be formed as a one-dimensional pattern 1110, which is recorded in one dimension, and a two-dimensional pattern 1120, which is recorded in two dimensions.

Here, the one-dimensional pattern 1110 may provide information using a binary signal by setting the N-pole and S-pole of the magnetic paint to 1 and 0, respectively.

Here, describing an example of the one-dimensional pattern 1110, a magnetic pattern is formed using only the N-pole and the S-pole, as shown in the table below, and location information (e.g., information about the exits of a subway station, and the like) may be provided using the binary signal of each pattern.

TABLE 1

| magnetic pattern | information |
|---|---|
| NNNNNNNS | North exit 1 |
| NNNNNNSS | North exit 2 |
| SSSSSSSN | South exit 1 |
| SSSSSSNN | South exit 2 |
| NNSSSNNN | West exit 1 |
| NNNSSSNN | West exit 2 |
| SSNNNSSS | East exit 1 |
| SSSNNNSS | East exit 2 |

Here, because the two-dimensional pattern 1120 can be formed as a Quick Response (QR) code, it may include more information than conventional patterns, and the above-described kinds of information may be visually or audibly provided to a user by operating a magnetic field detection element (a magnetic sensor), or the like in conjunction with a user terminal, or the like.

Also, because the one-dimensional pattern 1110 and the two-dimensional patterns 1120 may include various colors, more various kinds of information may be included therein by combining magnetic properties and optical properties.

Consequently, the one-dimensional pattern 1110 and the two-dimensional patterns 1120 may be formed using only an N-pole and an S-pole, or may be formed by adding three red, green and blue (RGB) colors thereto.

Here, when magnetic properties and optical properties are combined, the amount of information that can be included in a pattern is exponentially increased, compared to the case in which a pattern is formed using only the magnetic properties, and because information can be recorded based on a base-6 number system, which has higher operation efficiency than a binary number system (N, S), much more information may be recorded per unit length or unit area. This may improve the reliability of information because the amount of initially input information affects the accuracy of a resultant information amount when Artificial Intelligence (AI) is used for a mobile electronic communication device.

That is, the one-dimensional pattern 1110 and the two-dimensional pattern 1120 according to an embodiment of the present disclosure may provide much more information by changing a magnetic pattern in the form of binary bits into multiple bits.

Also, a specific pattern according to an embodiment of the present disclosure may enable a user to easily collect information by telling the location of an optical pattern using a simple magnetic pattern or by telling the location of a magnetic pattern using an optical pattern, and this will be described in detail with reference to FIG. 14.

Also, because a specific pattern according to an embodiment of the present disclosure can be applied to flat sidewalk pavers having no bumps, unlike the conventional sidewalk pavers for the visually impaired, it is easily constructed and economical, and much more information may be set therein, compared to bumpy sidewalk pavers.

Also, a specific pattern according to an embodiment of the present disclosure may be simply constructed, and has an advantage in that, when it is necessary to change information included therein, the information may be easily modified.

Also, a specific pattern according to an embodiment of the present disclosure may provide convenience and safety to normal pedestrians as well as visually impaired people because it may be formed in various colors, and has an advantage in that an aesthetic impression may be secured because there is no limitation as to the color of paint.

Also, a specific pattern according to an embodiment of the present disclosure may provide information by combining a magnetic signal by a magnetic pattern with an optical signal by an optical pattern, or the magnetic signal and the optical signal may be formed to have the same pattern such that they are used in a mutually complementary manner.

For example, when the specific pattern according to an embodiment of the present disclosure is recorded using an N-pole and an S-pole, it is represented as respective colors corresponding to the poles, whereby the magnetic signal and the optical signal may be used in a mutually complementary manner.

Also, the specific pattern may give an effect of lanes in a road in which magnetic paint is used, and using this, movement of a pedestrian or autonomous driving of a wheelchair or the like may be guided.

Figures 13, 14, 15:
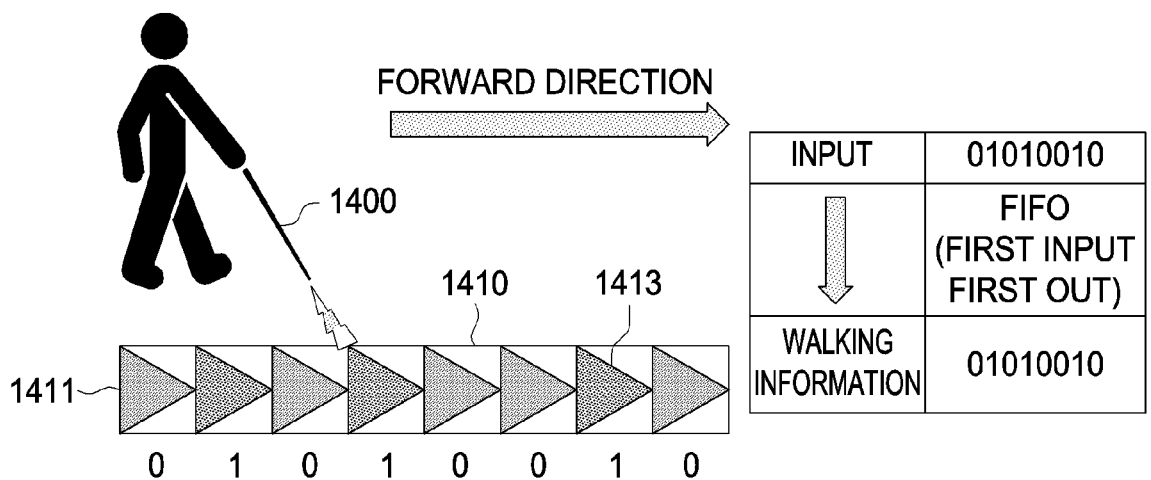
FIG. 13 is a table illustrating a signal for unit information provided to the pattern of magnetic paint.
FIG. 14 is a table illustrating an example of a base-6 number system generated through a complex pattern.
FIG. 15 is an exemplary view of generation of walking information when walking in a forward direction.

FIG. 13 is a table illustrating a signal for unit information provided to the pattern of magnetic paint.

In the case of a complex pattern, in which the magnetic pattern and the optical pattern are combined, because a single element of the pattern is able to represent much information, much information may be recorded per unit length or unit area.

Also, because a two-dimensional pattern is able to provide an exponential amount of information, compared to a one-dimensional pattern, it may provide a greater amount of information than that provided by a conventional QR code.

Referring to FIG. 13, there is a great difference between the amount of information that can be generated through a one-dimensional complex pattern having a fixed length (e.g., 2) and having two elements and the amount of information that can be generated through a two-dimensional complex pattern (e.g., 2×2) corresponding to the fixed length.

Here, the one-dimensional complex pattern may provide up to 36 kinds of information using the two elements, but the two-dimensional complex pattern having the same length may provide 1296 kinds of information.

Accordingly, the complex pattern of a two-dimensional array, that is, the combination of a magnetic pattern and an optical pattern, may record an exponential amount of information, compared to the complex pattern of a one-dimensional array, and may provide much more information to a user.

FIG. 14 is a table illustrating an example of a base-6 number system generated through a complex pattern.

As described above, a magnetic pattern in the form of binary bits may be converted into multiple bits by processing the magnetic pattern using multiple colors according to an embodiment of the present disclosure, whereby much more information may be provided per unit length or unit area.

In the case of a mobile electronic communication device for which AI is used, the amount of initially input information affects the accuracy and amount of information presented as a result.

Referring to FIG. 14, the pattern according to an embodiment of the present disclosure may provide a binary signal configured with 0 and 1 through a one-dimensional magnetic pattern configured with an N-pole and an S-pole, and three pieces of color information, including red, green, and blue (RGB), are added, whereby a senary signal configured with 0, 1, 2, 3, 4, and 5 may be provided and more various kinds of information may be provided per unit length or unit area.

For example, 128 (a decimal number) is converted into a binary number 10000000, which requires a physical space for an 8-digit number. However, 128 (a decimal number) is converted into a quaternary number 2000, which uses only four digits, and is converted into a base-6 number 332, which uses only three digits, so the physical space therefor may be significantly reduced and much more information may be recorded per unit length or unit area.

Figure 16:
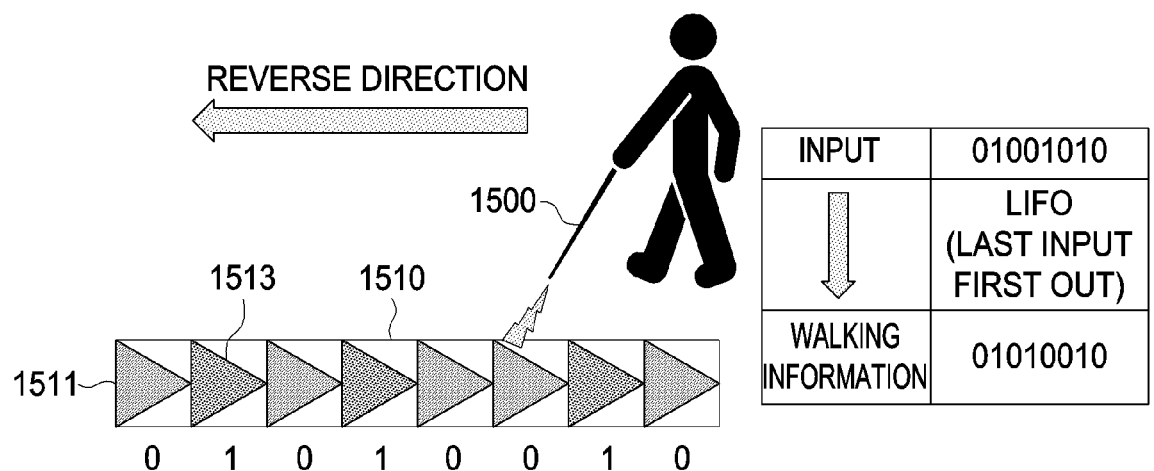
FIG. 16 is an exemplary view of generation of walking information when walking in a reverse direction.

FIG. 15 is an example view of generation of walking information when walking in a forward direction, and FIG. 16 is an exemplary view of generation of walking information when walking in a reverse direction.

Referring to FIG. 15 and FIG. 16, it should be possible to read patterns 1410 and 1510 generated using magnetic paint both in a forward direction and in a reverse direction, rather than in one direction, and when reading the pattern, the walking information recognition apparatuses 1400 and 1500 according to an embodiment of the present disclosure are required to generate the same walking information.

Accordingly, the patterns 1410 and 1510 according to an embodiment of the present disclosure are recorded symmetrically or asymmetrically such that a pedestrian clearly recognizes his or her direction, and signals input from the patterns 1410 and 1510 may be processed differently depending on the direction.

Also, the pattern 1410 or 1510 according to an embodiment of the present disclosure is formed as a magnetic pattern such that the frequency of the pattern detected at the start point is set different from the frequency of the pattern detected at the arrival point, whereby information about arrival at the destination may be provided.

Also, the pattern 1410 or 1510 according to an embodiment of the present disclosure is formed as a pattern that has the same frequency at the start point and the destination but the frequency changes in the course of the path, and then the pattern may be provided to a user.

Also, the pattern 1410 or 1510 according to an embodiment of the present disclosure is formed as an optical pattern and is symmetrically recorded such that the same information can be acquired regardless of the location at which access is made, whereby malfunction of an optical sensor (a color detection element) may be prevented. Alternatively, a specific optical pattern is recorded at the start and end of the pattern, whereby malfunction of the color detection element may be prevented.

Referring to FIG. 15 and FIG. 16, a user carrying the walking information recognition apparatus 1400 or 1500 according to an embodiment of the present disclosure may recognize a pattern formed of any one or more of a magnetic pattern, or an optical pattern, or a combination thereof when walking.

Here, the pattern 1410 or 1510 is a magnetic pattern or an optical pattern, and may provide a binary signal of 0 (1411 or 1511) and 1 (1413 or 1513), and the shape of each pattern may be formed to include movement direction information and to have directionality depending on the forward direction or the reverse direction based on the walking information.

For example, referring to FIG. 15 and FIG. 16, the patterns 1410 and 1510 may be formed to have a triangular shape indicating a forward direction, and an optical sensor included in the walking information recognition apparatus 1400 or 1500 according to an embodiment of the present disclosure may determine the direction of walking by recognizing the shape of the pattern.

Also, as described above, the walking information recognition apparatus 1400 or 1500 according to an embodiment of the present disclosure may differently process the input signals included in the patterns 1410 and 1510 by identifying the forward direction and the reverse direction.

As illustrated in FIG. 15, when a pedestrian carrying the walking information recognition apparatus 1400 according to an embodiment of the present disclosure is walking in the forward direction while recognizing the pattern 1410, the signal input to the walking information recognition apparatus may be 01010010.

Here, when it determines that the direction is the forward direction based on the shape of the pattern 1410 input through the optical sensor, the walking information recognition apparatus 1400 may extract walking information by processing the signal in a First-Input First-Out (FIFO) manner, in which case the walking information may be 01010010.

Also, as illustrated in FIG. 16, when a pedestrian carrying the walking information recognition apparatus 1500 according to an embodiment of the present disclosure is walking in the reverse direction while recognizing the pattern 1510, the signal input to the walking information recognition apparatus 1500 may be 01001010.

Here, when it determines that the direction is the reverse direction based on the shape of the pattern 1510 input through the optical sensor, the walking information recognition apparatus 1500 may extract walking information by processing the signal in a Last-Input First-Out (LIFO) manner, in which case the walking information may be 01010010.

Figure 17:
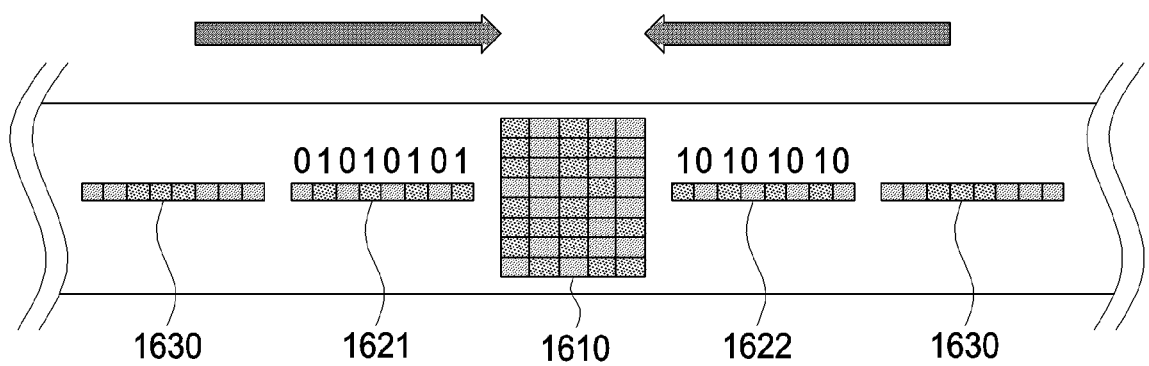
FIG. 17 is an exemplary view of control of an optical sensor by a magnetic sensing signal.

FIG. 17 is an exemplary view of control of an optical sensor by a magnetic sensing signal.

According to an embodiment of the present disclosure, the magnetic patterns 1621, 1622, and 1630 and the optical pattern 1610 may be designed to have different functions.

In an embodiment of the present disclosure, magnetic paint or the magnetic patterns 1621, 1622, and 1630 may provide only direction information for indicating the location of the optical pattern 1610, and the optical pattern 1610 found at the location may provide various kinds of other information, whereby the roles thereof may be divided.

Here, the optical pattern 1610 may use a large number of colors for respective information units, as described above, thereby providing more information than an existing method. An example of such information may include information about buildings at the corresponding location, a pedestrian-only road, nearby tourism information, and the like.

Here, if an optical sensor always operates, a waste of power may be caused, and because there is a limit on the capacity of a portable battery, the optical sensor may be operated only when a specific magnetic pattern 1621 or 1622 is input.

For example, referring to FIG. 17, the one-dimensional magnetic patterns 1621, 1622, and 1630 may provide a user with the current location and information about the location of the optical pattern 1610.

Here, because the optical pattern 1610 is formed in two dimensions, it may provide various kinds of information, such as detailed information about the corresponding location, nearby tourism information, and the like.

Here, the magnetic patterns 1621 and 1622 near the optical pattern 1610 are formed to have an arbitrarily set specific pattern (e.g., 01010101), and the walking information recognition apparatus according to an embodiment of the present disclosure may operate the optical sensor when it recognizes the magnetic pattern 1621 or 1622 having the specific pattern.

Also, because it should be possible to operate the optical sensor at the same location even when a user carrying the walking information recognition apparatus according to an embodiment of the present disclosure walks in the reverse direction, the magnetic patterns 1621 and 1622 that are symmetrically placed based on the optical pattern 1610 may be formed as patterns that are symmetrical to each other.

In FIG. 17, the shade of each of the patterns 1610, 1621, 1622, and 1630 is illustrated as having two levels, but it is not limited thereto. Also, each of the magnetic patterns 1621, 1622, and 1630 is illustrated as a one-dimensional pattern and the optical pattern 1610 is illustrated as a two-dimensional pattern, but they are not limited thereto.

Figure 18:
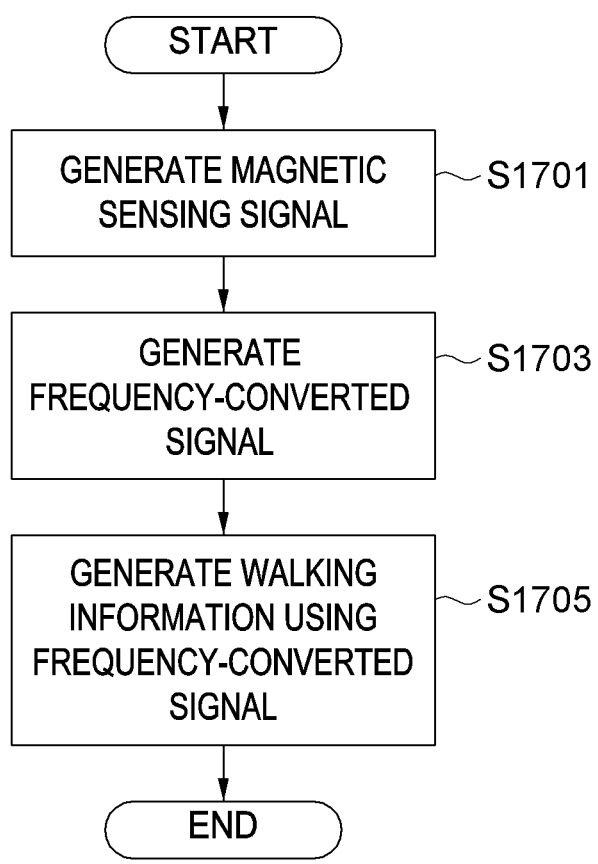
FIG. 18 is a flowchart of a method for recognizing walking information using multiple magnetic sensors according to an embodiment of the present disclosure.

FIG. 18 is a flowchart of a method for recognizing walking information using multiple magnetic sensors according to an embodiment of the present disclosure.

Referring to FIG. 18, in the method for recognizing walking information using multiple magnetic sensors according to an embodiment of the present disclosure, first, a magnetic sensing signal is generated from magnetic paint applied to a ground at step S1701.

Also, in the method for recognizing walking information using multiple magnetic sensors according to an embodiment of the present disclosure, a frequency-converted signal is generated using the magnetic sensing signal at step S1703.

Also, in the method for recognizing walking information using multiple magnetic sensors according to an embodiment of the present disclosure, walking information is generated using the frequency-converted signal at step S1705.

Here, the frequency-converted signal may be generated by generating detection signals by detecting the magnetic sensing signal at preset periods, generating average signals by averaging a preset number of detection signals, grouping the average signals in a preset conversion unit, and performing frequency conversion thereon.

Here, the magnetic sensing signal may include a first magnetic sub-signal generated from the magnetic paint through a first magnetic sensor and a second magnetic sub-signal generated from the magnetic paint through a second magnetic sensor.

Here, the frequency-converted signal may be generated using a noise-reduced signal generated using the difference between the first magnetic sub-signal and the second magnetic sub-signal.

Here, the noise-reduced signal may be generated using the differences between the average signals corresponding to the first magnetic sub-signal and the average signals corresponding to the second magnetic sub-signal.

Here, the method for recognizing walking information using multiple magnetic sensors according to an embodiment of the present disclosure may further include generating direction information of the magnetic paint using the difference between the time at which the first magnetic sub-signal is received and the time at which the second magnetic sub-signal is received.

Here, the method for recognizing walking information using multiple magnetic sensors according to an embodiment of the present disclosure may further include generating an optical sensing signal from the magnetic paint, and at step S1705, walking information may be generated using any one or more of the frequency-converted signal, or the optical sensing signal, or a combination thereof.

Here, the magnetic sensing signal may correspond to a one-dimensional magnetic pattern or a two-dimensional magnetic pattern.

Here, the optical sensing signal is configured to subdivide the magnetic pattern corresponding to the magnetic sensing signal, thereby increasing the amount of information per unit length or unit area, compared to the case in which only the magnetic sensing signal is used.

Figure 19:
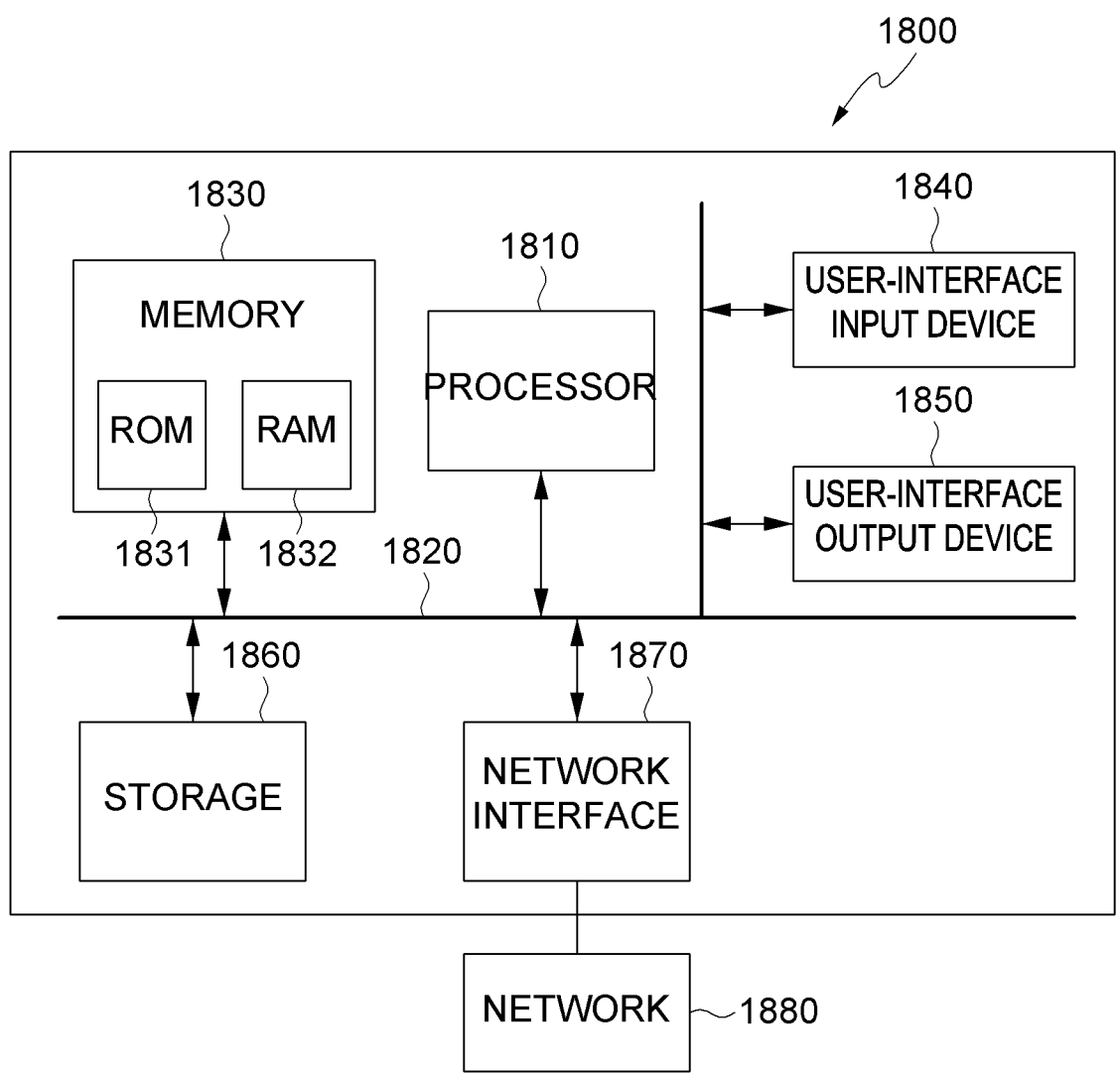
FIG. 19 is a view illustrating a computer system according to an embodiment of the present disclosure.

FIG. 19 is a view illustrating a computer system according to an embodiment of the present disclosure.

Referring to FIG. 19, an embodiment of the present disclosure may be implemented in a computer system such as a computer-readable recording medium or a mobile electronic device. As illustrated in FIG. 18, the computer system 1800 may include one or more processors 1810, memory 1830, a user-interface input device 1840, a user-interface output device 1850, and storage 1860, which communicate with each other via a bus 1820. Also, the computer system 1800 may further include a network interface 1870 connected to a network 1880. The processor 1810 may be a central processing unit or a semiconductor device for executing processing instructions stored in the memory 1830 or the storage 1860. The memory 1830 and the storage 1860 may be any of various types of volatile or nonvolatile storage media. For example, the memory may include ROM 1831 or RAM 1832.

Here, the apparatus for recognizing walking information using multiple magnetic sensors according to an embodiment of the present disclosure may include a magnetic sensor for generating a magnetic sensing signal from magnetic paint applied to a ground, a frequency conversion unit for generating a frequency-converted signal using the magnetic sensing signal, and a control unit for generating walking information using the frequency-converted signal.

Here, the frequency conversion unit generates detection signals by detecting the magnetic sensing signal at preset periods, generates average signals by averaging a preset number of detection signals, groups the average signals in a preset conversion unit, and performs frequency conversion thereon, thereby generating the frequency-converted signal.

Here, the magnetic sensing signal may include a first magnetic sub-signal generated from the magnetic paint through a first magnetic sensor and a second magnetic sub-signal generated from the magnetic paint through a second magnetic sensor.

Here, the frequency-converted signal may be generated using a noise-reduced signal generated using the difference between the first magnetic sub-signal and the second magnetic sub-signal.

Here, the noise-reduced signal may be generated using the differences between the average signals corresponding to the first magnetic sub-signal and the average signals corresponding to the second magnetic sub-signal.

Here, the control unit may generate direction information of the magnetic paint using the difference between the time at which the first magnetic sub-signal is received and the time at which the second magnetic sub-signal is received.

Here, the apparatus for recognizing walking information using multiple magnetic sensors according to an embodiment of the present disclosure may further include an optical sensor for generating an optical sensing signal from the magnetic paint, and the control unit may generate walking information using any one or more of the frequency-converted signal, or the optical sensing signal, or a combination thereof.

Here, the magnetic sensing signal may correspond to a one-dimensional magnetic pattern or a two-dimensional magnetic pattern.

Here, the optical sensing signal is configured to subdivide the magnetic pattern corresponding to the magnetic sensing signal, thereby increasing the amount of information per unit length or unit area, compared to the case in which only the magnetic sensing signal is used.

Here, the control unit may correspond to the processor 1800 of the computer system, the magnetic sensor and the optical sensor may communicate with the processor 1800 via the bus 1820, and the generated magnetic sensing signal and optical sensing signal may be stored in the memory 1830 or the storage 1860.

Accordingly, an embodiment of the present disclosure may be implemented as a non-transitory computer-readable medium in which methods implemented using a computer or instructions executable in a computer are recorded. When the computer-readable instructions are executed by a processor, the computer-readable instructions may perform a method according to at least one aspect of the present disclosure.

Also, according to an embodiment of the present disclosure, magnetic information or optical information is recorded as a one-dimensional or two-dimensional pattern by applying magnetic paint or multiple colors of paint to commonly-used sidewalk pavers having no bumps, rather than using bumpy sidewalk pavers for the visually impaired, and the magnetic information or the optical information is read using a magnetic sensor or an optical sensor, whereby walking information may be provided not only to visually impaired people but also to normal people.

Also, according to an embodiment of the present disclosure, both a one-dimensional pattern and a two-dimensional pattern are applied to sidewalk pavers, and magnetic information and optical information of each of the patterns may be detected and used to complement each other, whereby the effect of noticeably reducing malfunction of sensors for sensing the respective pieces of information may be provided.

Here, the provided walking information may be information related to the location of the pattern and a movement direction and various kinds of information that a user who constructs the pattern intends to transfer.

Accordingly, in an embodiment of the present disclosure, a magnetic field detection element for recognizing the above-mentioned information and an optical detection element (a color detection element) for identifying color may be used in combination with each other, and further information may be visually or audibly transferred to pedestrians by interworking with a user terminal such as a mobile electronic communication device.

The above-described embodiment may be practiced by applying color paint having magnetic information and optical information to a ground, or the like, without being limited to sidewalk pavers, and may also be applied to a mobile object that is moving using the information and a system for operating the same.

Also, an embodiment of the present disclosure includes one or more magnetic sensors for recognizing the magnetic pattern, thereby generating a noise-reduced signal using the difference between signals input to the respective magnetic sensors and detecting magnetic information using the noise-reduced signal.

Hereinafter, a preferred embodiment of the present disclosure will be described in detail with reference to the accompanying drawings.

FIG. 20 is a use-case view of an apparatus for recognizing walking information using magnetic/optical patterns according to an embodiment of the present disclosure.

Referring to FIG. 20, an apparatus 2010 for recognizing walking information using magnetic/optical patterns according to an embodiment of the present disclosure is made in the form of a stick such that a user (a pedestrian or the like) is able to carry the same when walking, and may be configured to recognize information stored in magnetic paint 2020 applied to a ground 2030.

Here, the magnetic paint 2020 may form a specific pattern using magnetic properties, and may alternatively form a specific pattern using optical properties that differ in color.

Here, the apparatus 2010 for recognizing walking information according to an embodiment of the present disclosure may read the specific pattern of the magnetic paint 2020 applied to the ground, recognize walking information included in the specific pattern, and provide the walking information to a user.

Here, the walking information may include all kinds of information necessary for walking, such as the current location, nearby buildings, tourist spot information, a sidewalk range, and the like.

FIG. 21 is an exemplary view illustrating the pattern of magnetic paint applied to a ground according to the present disclosure.

Conventional sidewalk pavers for the visually impaired may simply provide only direction information, but a pattern or an alternating pattern may be drawn with magnetic paint according to an embodiment of the present disclosure, whereby location information and various kinds of other information may be provided as well as the direction information.

Referring to FIG. 21, the pattern of magnetic paint applied to a ground 2130 according to an embodiment of the present disclosure may be formed as a one-dimensional pattern 2110, which is recorded in one dimension, and a two-dimensional pattern 2120, which is recorded in two dimensions.

Here, the one-dimensional pattern 2110 may provide information using a binary signal by setting the N-pole and S-pole of the magnetic paint to 1 and 0, respectively.

Here, describing an example of the one-dimensional pattern 2110, a magnetic pattern is formed using only the N-pole and the S-pole, as shown in Table 1 above, and location information (e.g., information about the exits of a subway station, and the like) may be provided using the binary signal of each pattern.

Here, because the two-dimensional pattern 2120 can be formed as a Quick Response (QR) code, it may include more information than conventional patterns, and the above-described kinds of information may be visually or audibly provided to a user by operating a magnetic field detection element (a magnetic sensor), or the like in conjunction with a user terminal, or the like.

Also, because the one-dimensional pattern 2110 and the two-dimensional patterns 2120 may include various colors, more various kinds of information may be included therein by combining magnetic properties and optical properties.

Consequently, the one-dimensional pattern 2110 and the two-dimensional patterns 2120 may be formed using only an N-pole and an S-pole, or may be formed by adding three red, green and blue (RGB) colors thereto.

Here, when magnetic properties and optical properties are combined, the amount of information that can be included in a pattern is exponentially increased, compared to the case in which a pattern is formed using only the magnetic properties, and because information can be recorded based on a base-6 number system, which has higher operation efficiency than a binary number system (N, S), much more information may be recorded per unit length or unit area.

This may improve the reliability of information because the amount of initially input information affects the accuracy of a resultant information amount when AI is used for a mobile electronic communication device.

That is, the one-dimensional pattern 2110 and the two-dimensional pattern 2120 according to an embodiment of the present disclosure may provide much more information by changing a magnetic pattern in the form of binary bits into multiple bits.

Also, a specific pattern according to an embodiment of the present disclosure may enable a user to easily collect information by telling the location of an optical pattern using a simple magnetic pattern or by telling the location of a magnetic pattern using an optical pattern, and this will be described in detail with reference to FIG. 27.

Also, because a specific pattern according to an embodiment of the present disclosure can be applied to flat sidewalk pavers having no bumps, unlike the conventional sidewalk pavers for the visually impaired, it is easily constructed and economical, and much more information may be set therein, compared to bumpy pavers.

Also, a specific pattern according to an embodiment of the present disclosure may be simply constructed, and has an advantage in that, when it is necessary to change information included therein, the information may be easily modified.

Also, a specific pattern according to an embodiment of the present disclosure may provide convenience and safety to normal pedestrians as well as visually impaired people because it may be formed in various colors, and has an advantage in that an aesthetic impression may be secured because there is no limitation as to the color of paint.

Also, a specific pattern according to an embodiment of the present disclosure may provide information by combining a magnetic signal by a magnetic pattern with an optical signal by an optical pattern, or the magnetic signal and the optical signal may be formed to have the same pattern such that they are used in a mutually complementary manner.

For example, when the specific pattern according to an embodiment of the present disclosure is recorded using an N-pole and an S-pole, it is represented as respective colors corresponding to the poles, whereby the magnetic signal and the optical signal may be used in a mutually complementary manner.

Also, the specific pattern may give an effect of lanes in a road in which magnetic paint is used, and using this, movement of a pedestrian or autonomous driving of a wheelchair or the like may be guided.

FIG. 22 is a table illustrating a signal for unit information provided to the pattern of magnetic paint.

In the case of a complex pattern, in which the magnetic pattern and the optical pattern are combined, because a single element of the pattern is able to represent much information, much information may be recorded per unit length or unit area.

Also, because a two-dimensional pattern is able to provide an exponential amount of information, compared to a one-dimensional pattern, it may provide a greater amount of information than that provided by a conventional QR code.

Referring to FIG. 22, there is a great difference between the amount of information that can be generated through a one-dimensional complex pattern having a fixed length (e.g., 2) and having two elements and the amount of information that can be generated through a two-dimensional complex pattern (e.g., 2×2) corresponding to the fixed length.

Here, the one-dimensional complex pattern may provide up to 36 kinds of information using the two elements, but the two-dimensional complex pattern having the same length may provide 1296 kinds of information.

Accordingly, the complex pattern of a two-dimensional array, that is, the combination of a magnetic pattern and an optical pattern, may record an exponential amount of information, compared to the complex pattern of a one-dimensional array, and may provide much more information to a user.

FIG. 23 is a table illustrating an example of a base-6 number system generated through a complex pattern.

As described above, a magnetic pattern in the form of binary bits may be converted into multiple bits by processing the magnetic pattern using multiple colors according to an embodiment of the present disclosure, whereby much more information may be provided per unit length or unit area.

This may improve the reliability of information because the amount of initially input information affects the accuracy of a resultant information amount when AI is used for a mobile electronic communication device.

Referring to FIG. 23, the pattern according to an embodiment of the present disclosure may provide a binary signal configured with 0 and 1 through a one-dimensional magnetic pattern configured with an N-pole and an S-pole, and three pieces of color information, including red, green, and blue (RGB), are added, whereby a senary signal configured with 0, 1, 2, 3, 4, and 5 may be provided and more various kinds of information may be provided per unit length or unit area.

For example, 128 (a decimal number) is converted into a binary number 10000000, which requires a physical space for an 8-digit number. However, 128 (a decimal number) is converted into a quaternary number 2000, which uses only four digits, and is converted into a base-6 number 332, which uses only three digits, so the physical space therefor may be significantly reduced and much more information may be recorded per unit length or unit area.

FIG. 24 is an example view of generation of walking information when walking in a forward direction, and FIG. 25 is an exemplary view of generation of walking information when walking in a reverse direction.

Referring to FIG. 24 and FIG. 25, it should be possible to read patterns 2410 and 2510 generated using magnetic paint both in a forward direction and in a reverse direction, rather than in one direction, and when reading the pattern, the walking information recognition apparatuses 2400 and 2500 according to an embodiment of the present disclosure are required to generate the same walking information.

Accordingly, the patterns 2410 and 2510 according to an embodiment of the present disclosure are recorded symmetrically or asymmetrically such that a pedestrian clearly recognizes his or her direction, and signals input from the patterns 2410 and 2510 may be processed differently depending on the direction.

Also, the pattern 2410 or 2510 according to an embodiment of the present disclosure is formed as a magnetic pattern such that the frequency of the pattern detected at the start point is set different from the frequency of the pattern detected at the arrival point, whereby information about arrival at the destination may be provided.

Also, the pattern 2410 or 2510 according to an embodiment of the present disclosure is formed as a pattern that has the same frequency at the start point and the destination but the frequency changes in the course of the path, and then the pattern may be provided to a user.

Also, the pattern 2410 or 2510 according to an embodiment of the present disclosure is formed as an optical pattern and is symmetrically recorded such that the same information can be acquired regardless of the location at which access is made, whereby malfunction of an optical sensor (a color detection element) may be prevented. Alternatively, a specific optical pattern is recorded at the start and end of the pattern, whereby malfunction of the color detection element may be prevented.

Referring to FIG. 25 and FIG. 25, a user carrying the walking information recognition apparatus 2400 or 2500 according to an embodiment of the present disclosure may recognize a pattern formed of any one or more of a magnetic pattern, or an optical pattern, or a combination thereof when walking.

Here, the pattern 2410 or 2510 is a magnetic pattern or an optical pattern, and may provide a binary signal of 0 (2411 or 2511) and 1 (2413 or 2513), and the shape of each pattern may be formed to include movement direction information and to have directionality depending on the forward direction or the reverse direction based on the walking information.

For example, referring to FIG. 24 and FIG. 25, the patterns 2410 and 2510 may be formed to have a triangular shape indicating a forward direction, and an optical sensor included in the walking information recognition apparatus 2400 or 2500 according to an embodiment of the present disclosure may determine the direction of walking by recognizing the shape of the pattern.

Also, as described above, the walking information recognition apparatus 2400 or 2500 according to an embodiment of the present disclosure may differently process the input signals included in the patterns 2410 and 2510 by identifying the forward direction and the reverse direction.

As illustrated in FIG. 24, when a pedestrian carrying the walking information recognition apparatus 2400 according to an embodiment of the present disclosure is walking in the forward direction while recognizing the pattern 2410, the signal input to the walking information recognition apparatus may be 01010010.

Here, when it determines that the direction is the forward direction based on the shape of the pattern 2410 input through the optical sensor, the walking information recognition apparatus 2400 may extract walking information by processing the signal in a First-Input First-Out (FIFO) manner, in which case the walking information may be 01010010.

Also, as illustrated in FIG. 25, when a pedestrian carrying the walking information recognition apparatus 2500 according to an embodiment of the present disclosure is walking in the reverse direction while recognizing the pattern 2510, the signal input to the walking information recognition apparatus 2500 may be 01001010.

Here, when it determines that the direction is the reverse direction based on the shape of the pattern 2510 input through the optical sensor, the walking information recognition apparatus 2500 may extract walking information by processing the signal in a Last-Input First-Out (LIFO) manner, in which case the walking information may be 01010010.

Figure 26:
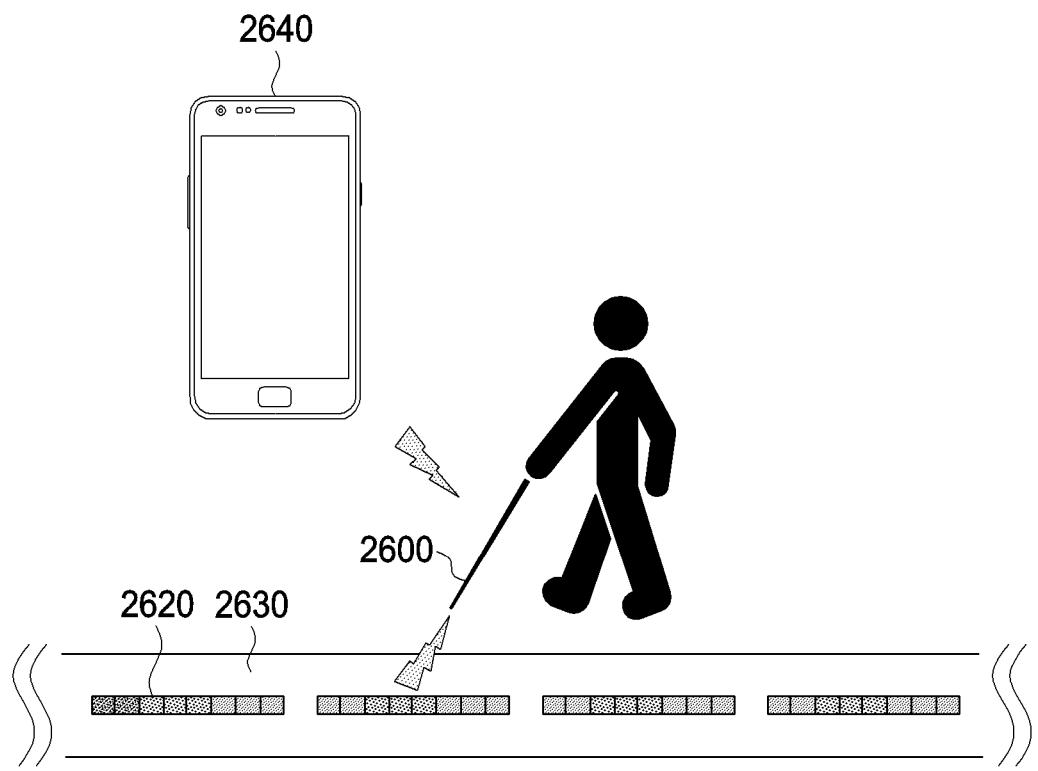
FIG. 26 is an exemplary view of communication with a user terminal according to an embodiment of the present disclosure.

FIG. 26 is an exemplary view of communication with a user terminal according to an embodiment of the present disclosure.

Referring to FIG. 26, the walking information recognition apparatus 7260 according to an embodiment of the present disclosure includes a magnetic sensor and/or an optical sensor for sensing the pattern (a magnetic pattern and/or an optical pattern) 2620 formed on a ground 2630, and may provide walking information to a user terminal (a mobile electronic communication device) 2640, such as a mobile phone, using wired or wireless communication by using the signal detected through the magnetic sensor and/or the optical sensor.

Here, the signal detected through the magnetic sensor may be converted into a tactile (e.g., vibration) or auditory (e.g., sound) signal through the user terminal 2640 and provided to the user, and the signal detected through the optical sensor may be visually provided through the display of the user terminal 2640.

As described above, the reason for varying the provision method is to improve the transfer efficiency and the amount of information provided to the user within the same amount of time.

Figure 27:
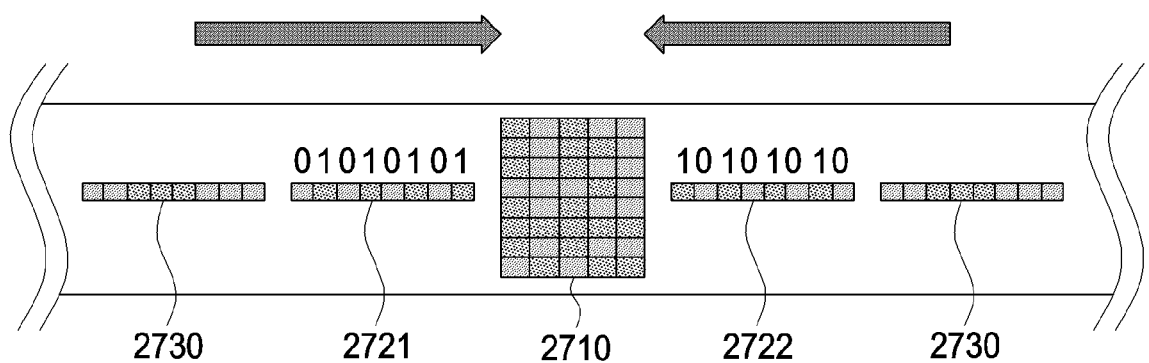
FIG. 27 is an exemplary view of control of an optical sensor by a magnetic sensing signal.

FIG. 27 is an exemplary view of control of an optical sensor by magnetic sensing information.

According to an embodiment of the present disclosure, the magnetic patterns 2721, 2722, and 2730 and the optical pattern 2710 may be designed to have different functions.

In an embodiment of the present disclosure, magnetic paint or the magnetic patterns 2721, 2722, and 2730 may provide only direction information for indicating the location of the optical pattern 2710, and the optical pattern 2710 found at the location may provide various kinds of other information, whereby the roles thereof may be divided.

Here, the optical pattern 2710 may use a large number of colors for respective information units, as described above, thereby providing more information than an existing method. An example of such information may include information about buildings at the corresponding location, a pedestrian-only road, nearby tourism information, and the like.

Here, if an optical sensor always operates, a waste of power may be caused, and because there is a limit on the capacity of a portable battery, the optical sensor may be operated only when a specific magnetic pattern 2721 or 2722 is input.

For example, referring to FIG. 27, the one-dimensional magnetic patterns 2721, 2722, and 2730 may provide a user with the current location and information about the location of the optical pattern 2710.

Here, because the optical pattern 2710 is formed in two dimensions, it may provide various kinds of information, such as detailed information about the corresponding location, nearby tourism information, and the like.

Here, the magnetic patterns 2721 and 2722 near the optical pattern 2710 are formed to have an arbitrarily set specific pattern (e.g., 01010101), and the walking information recognition apparatus according to an embodiment of the present disclosure may operate the optical sensor when it recognizes the magnetic pattern 2721 or 2722 having the specific pattern.

Also, because it should be possible to operate the optical sensor at the same location even when a user carrying the walking information recognition apparatus according to an embodiment of the present disclosure walks in the reverse direction, the magnetic patterns 2721 and 2722 that are symmetrically placed based on the optical pattern 2710 may be formed as patterns that are symmetrical to each other.

In FIG. 27, the shade of each of the patterns 2710, 2721, 2722, and 2730 is illustrated as having two levels, but it is not limited thereto. Also, each of the magnetic patterns 2721, 2722, and 2730 is illustrated as a one-dimensional pattern and the optical pattern 2710 is illustrated as a two-dimensional pattern, but they are not limited thereto.

Figure 28:
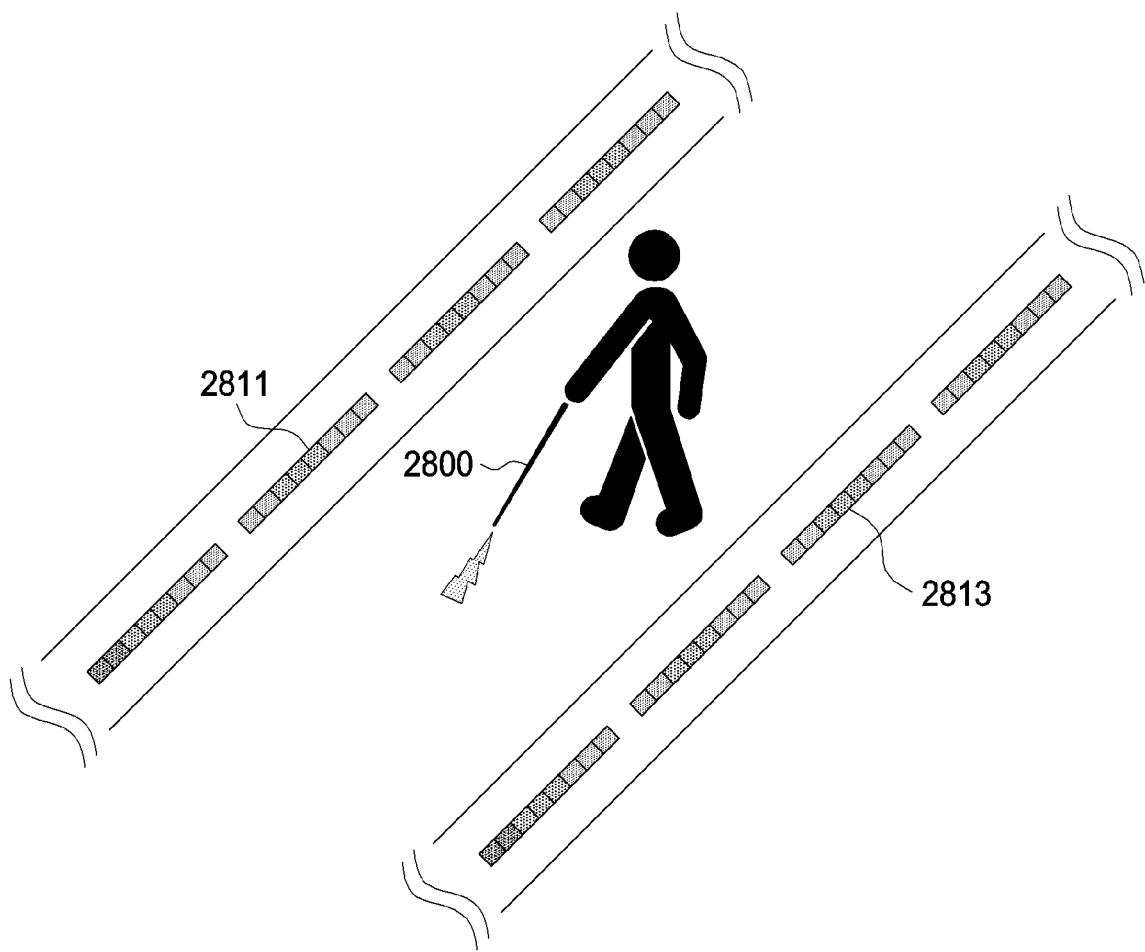
FIG. 28 is a use-case view of application of two magnetic patterns according to an embodiment of the present disclosure.

FIG. 28 is a use-case view of application of two magnetic patterns according to an embodiment of the present disclosure.

Referring to FIG. 28, two or more magnetic patterns 2811 and 2813 according to an embodiment of the present disclosure may be applied on both sides of a sidewalk.

Here, the first magnetic pattern 2811 and the second magnetic pattern 2813 applied on both sides of the sidewalk are formed to have the same pattern based on one direction, whereby a user carrying a walking information recognition apparatus 2800 according to an embodiment of the present disclosure may be provided with the same magnetic sensing information.

Alternatively, based on keeping to the right, the first magnetic pattern 2811 located on the right side of a pedestrian is formed to have a forward magnetic pattern, and the second magnetic pattern 2813 located on the left side of the pedestrian is formed to have a reverse pattern of the first magnetic pattern 2811, whereby fixed walking information is provided regardless of the direction in which the pedestrian is moving or different magnetic patterns may be formed to include different pieces of information depending on the movement direction.

Here, the location of the user who carries the walking information recognition apparatus 2800 according to an embodiment of the present disclosure may be detected using the strength of a magnetic field by the first magnetic pattern 2811 and the second magnetic pattern 2813, and a detailed description thereof will be made later with reference to FIG. 29.

Also, the above-described magnetic patterns 2811 and 2813 may be formed on both sides of a passage, thereby serving as lanes along which vehicles, wheelchairs, and the like are capable of moving.

Figure 29:
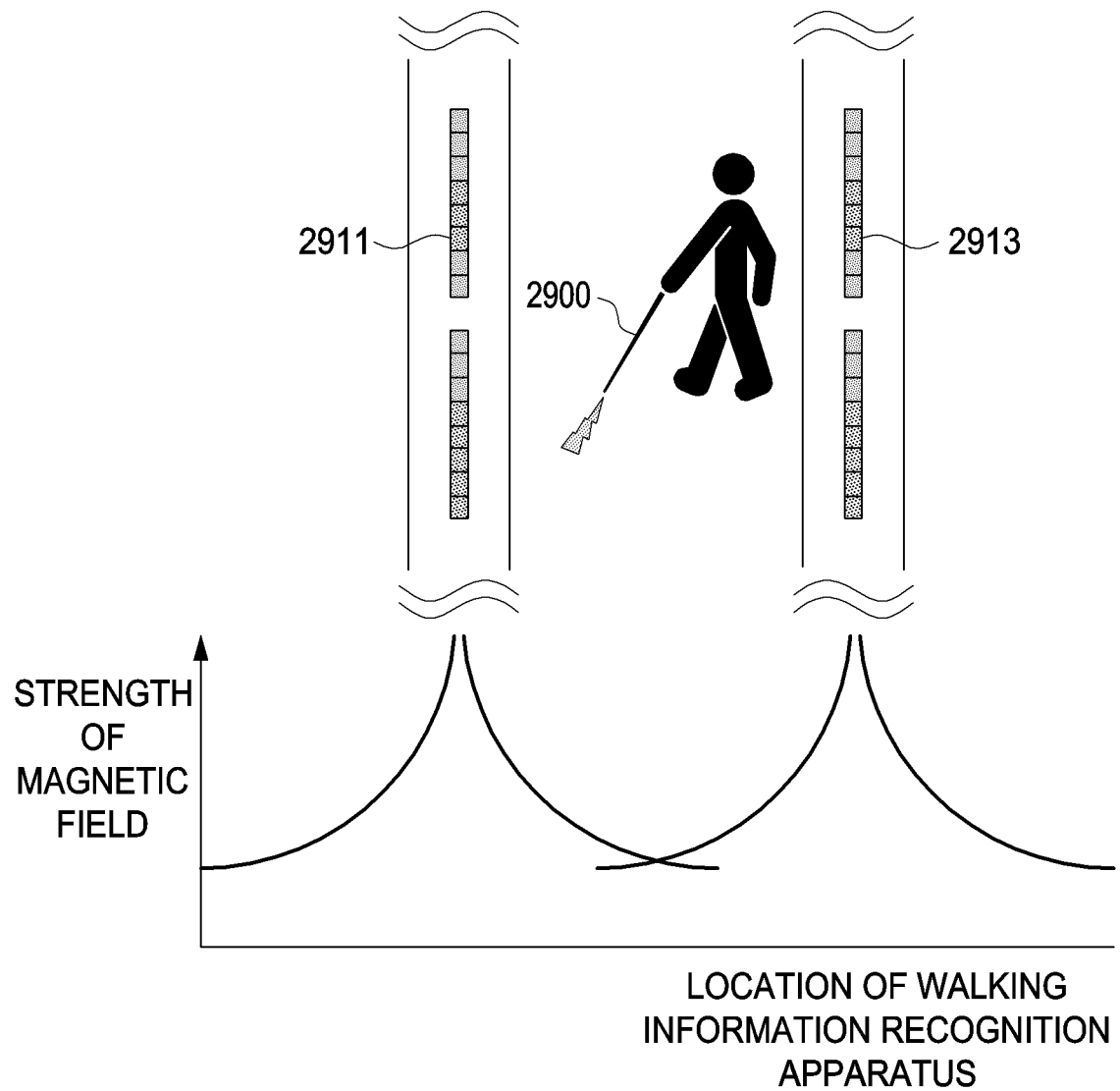
FIG. 29 is a graph illustrating the strength of a magnetic field depending on two magnetic patterns and the location of a walking information recognition apparatus.

FIG. 29 is a graph illustrating the strength of a magnetic field depending on two magnetic patterns and the location of a walking information recognition apparatus.

Referring to FIG. 29, the strengths of magnetic fields by a first magnetic pattern 2911 and a second magnetic pattern 2913 may vary depending on the location of a walking information recognition apparatus 2900 located between the first magnetic pattern 2911 and the second magnetic pattern 2913.

Here, when the walking information recognition apparatus 2900 according to an embodiment of the present disclosure comes closer to the first magnetic pattern 2911, the strength of the magnetic field by the first magnetic pattern 2911 increases, whereas when it comes closer to the second magnetic pattern 2913, the strength of the magnetic field by the second magnetic pattern 2913 increases, so a user carrying the walking information recognition apparatus 2900 according to an embodiment of the present disclosure may detect his or her location in the sidewalk.

Also, using the strength of the magnetic field by each of the magnetic patterns 2911 and 2913, the user may be prevented from walking in a roadway or a dangerous area and may be guided to a safe path.

Here, the walking information recognition apparatus 2900 according to an embodiment of the present disclosure may include two magnetic sensors in the form shown in FIG. 30, as will be described later, and may thereby induce the user to move to the center of the sidewalk, as described above.

Figure 30:
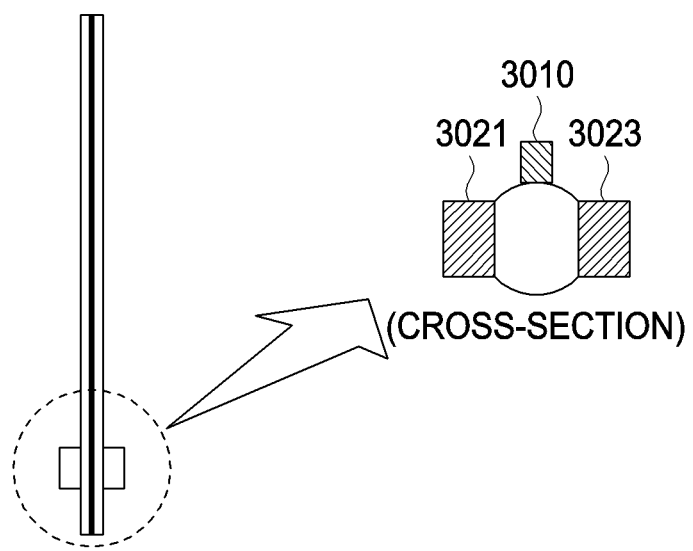
FIG. 30 is a structural diagram of a walking information recognition apparatus including two magnetic sensors according to an embodiment of the present disclosure.

FIG. 30 is a structural diagram of a walking information recognition apparatus including two magnetic sensors according to an embodiment of the present disclosure.

Referring to FIG. 30, the walking information recognition apparatus 2010 according to an embodiment of the present disclosure is made in the form of a stick such that a user (a pedestrian or the like) is able to carry the same when walking, and may include two magnetic sensors 3021 and 3023 capable of detecting magnetic signals on the left and right sides of the stick and a central marker 3010 through which the center of the stick can be identified.

Figure 31:
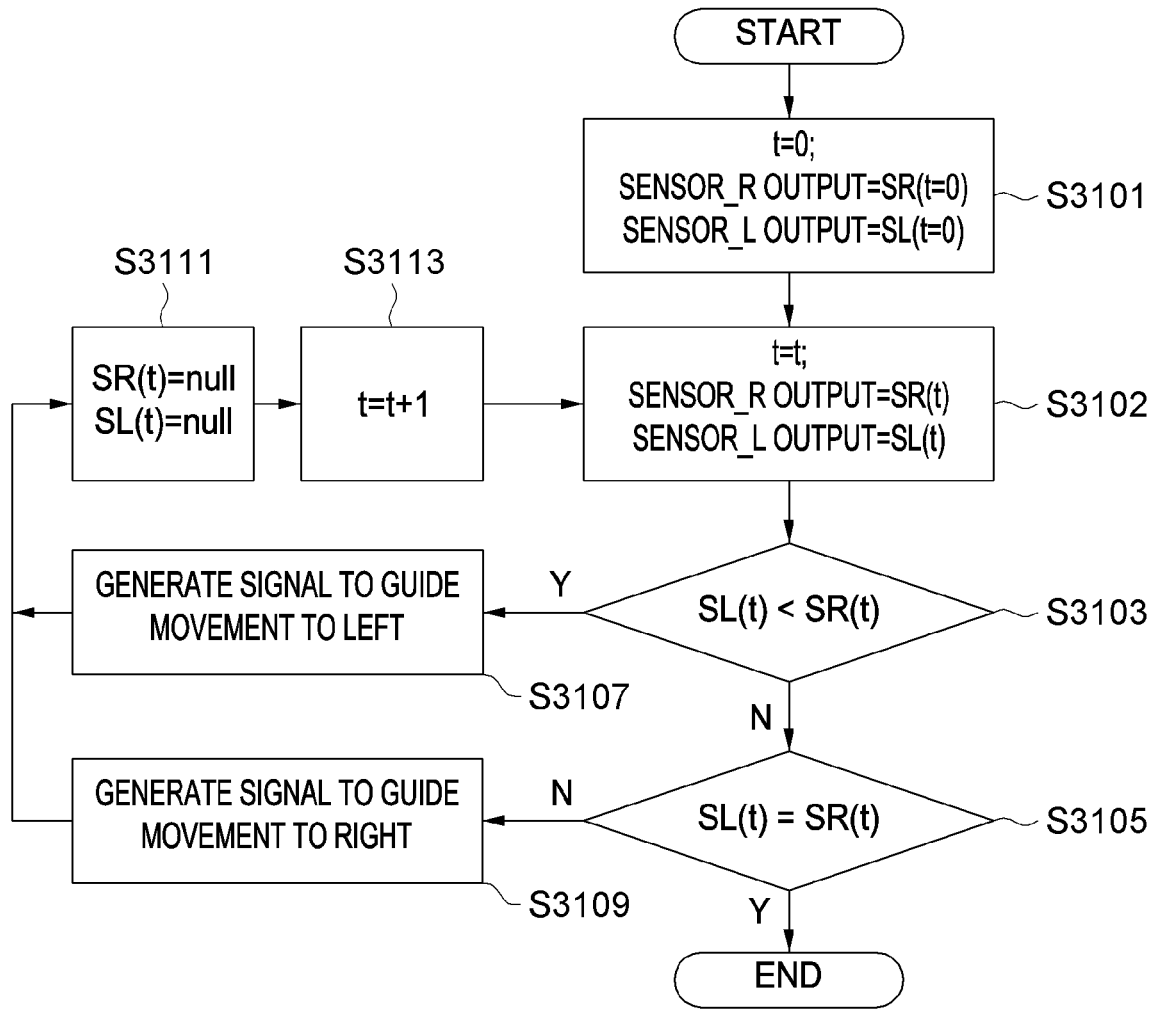
FIG. 31 is a flowchart of generation of a pedestrian guidance signal according to an embodiment of the present disclosure.

FIG. 31 is a flowchart of generation of a pedestrian guidance signal according to an embodiment of the present disclosure.

According to the embodiment of the present disclosure illustrated in FIG. 30, the two magnetic sensors 3021 and 3023 are installed at different locations in the walking information recognition apparatus 2010, and one or more kinds of magnetic paint applied to a ground may be identified using relative signals detected by the two sensors.

Also, an embodiment of the present disclosure may draw one or more lines on the ground with magnetic paint, and may guide a user or a moving object, such as a wheelchair or the like, to the center between the lines.

Here, in the method of generating a guidance signal according to an embodiment of the present disclosure, first, 0 is substituted into the variable 't', and the output of the first magnetic sensor 3023, which is located on the right side of the walking information recognition apparatus according to an embodiment of the present disclosure, and the output of the second magnetic sensor 3021, which is located on the left side thereof, may be respectively defined as and initialized to SR(t=0) and SL(t=0) at step S3101.

Here, the variable 't' may correspond to time, and SR(t) and SL(t) may correspond to the outputs of the respective magnetic sensors, which change over time.

Also, in the method of generating a guidance signal according to an embodiment of the present disclosure, SR(t) and SL(t) changing over time are defined to correspond to the time at step S3102, and SR(t) and SL(t) may be compared with each other at step S3103.

Here, in the method of generating a guidance signal according to an embodiment of the present disclosure, when SR(t) is greater than SL(t), a signal may be generated to guide movement to the left at step S3107, whereas when SR(t) is not greater than SL(t), whether SR(t) and SL(t) are equal to each other may be checked at step S3105.

Here, in the method of generating a guidance signal according to an embodiment of the present disclosure, when SL(t) is equal to SR(t), the above steps are repeated by going back to the start, whereas when SL(t) is not equal to SR(t), a signal may be generated to guide movement to the right at step S3109.

Here, in the method of generating a guidance signal according to an embodiment of the present disclosure, after a signal is generated to guide movement to the left or right, null is substituted into each of SR(t) and SL(t) at step S1111, t+1 is substituted into t, and the process may be performed again from step S3102 in order to again determine the current location of a user.

Accordingly, the method of generating a guidance signal according to an embodiment of the present disclosure repeatedly performs the above-described steps, thereby inducing a user or a moving object to walk or move in the center between the lines.

Figure 32:
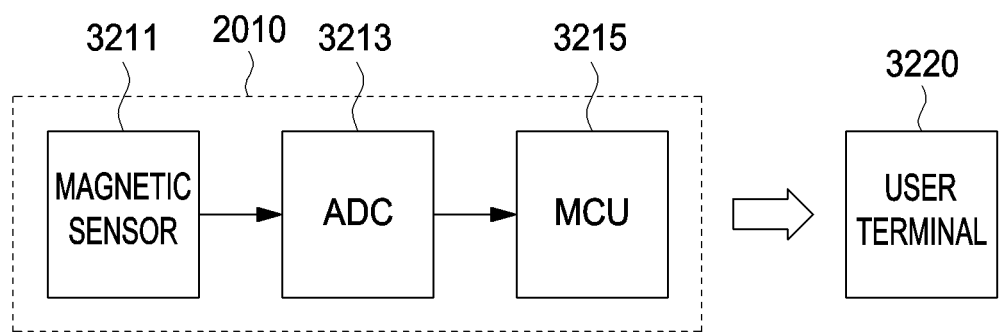
FIG. 32 is a block diagram of a walking information recognition apparatus according to an embodiment of the present disclosure.

FIG. 32 is a block diagram of a walking information recognition apparatus according to an embodiment of the present disclosure.

Referring to FIG. 32, the walking information recognition apparatus 2010 according to an embodiment of the present disclosure may include a magnetic sensor 3211, an Analog-Digital Converter (ADC) 3213, a processor (e.g., an MCU, a MICOM, or the like) 3215, and the like.

Also, although not illustrated in FIG. 32, the walking information recognition apparatus 2010 according to an embodiment of the present disclosure may further include an optical sensor, as described above, and may recognize walking information through an optical sensing signal input to the optical sensor.

Here, the walking information recognition apparatus 2010 according to an embodiment of the present disclosure may generate walking information from magnetic paint applied to a ground, and may provide the walking information to a user terminal 3220 through wired or wireless communication.

Here, the magnetic sensor 3211 may detect a magnetic signal from the magnetic paint applied to the ground.

Here, because the magnetic signal may be an analog signal, it may be converted into a digital signal through the analog-digital converter 3213, as will be described later.

Here, the magnetic sensor 3211 may also detect a noise signal due to the earth's magnetic field or an environment in which a magnetic field is generated or induced from nearby iron, or the like. Accordingly, the magnetic sensor may use a magnetic sensor configured to detect a dynamic signal rather than a static signal.

The magnetic sensor configured to detect a dynamic signal is not able to detect a signal when it is stationary on the magnetic paint in which magnetic information is recorded, and is able to detect a signal only when it is moving. That is, a sensor capable of detecting a change in a magnetic signal over time may be used.

Here, the analog-digital converter 3213 may convert the analog magnetic signal detected using the magnetic sensor into a digital signal such that the processor 3215 is able to process the signal.

Here, the analog-digital converter 3213 may be an ADC having the resolution of 12 bits or higher and a sampling rate equal to or greater than 1 kS/s.

Here, the processor 3215 may generate walking information by processing the digital signal converted through the analog-digital converter 3213.

More specifically, the processor 3215 performs Fast Fourier Transform (FFT) on the digital signal, thereby extracting a period of the pattern recorded in the magnetic paint, that is, a frequency.

Here, the processor 3215 may generate walking information based on the frequency and transfer the same to the user terminal 3220, and it is desirable to transfer the walking information analyzed through fast Fourier transform to the user terminal 3220 within one second from signal detection.

Here, a communication method for transferring the walking information may be a short-range wireless communication method, such as Wi-Fi, near-field communication (NFC), Bluetooth, or the like, and the walking information may be communicated in a wired manner.

Figure 33:
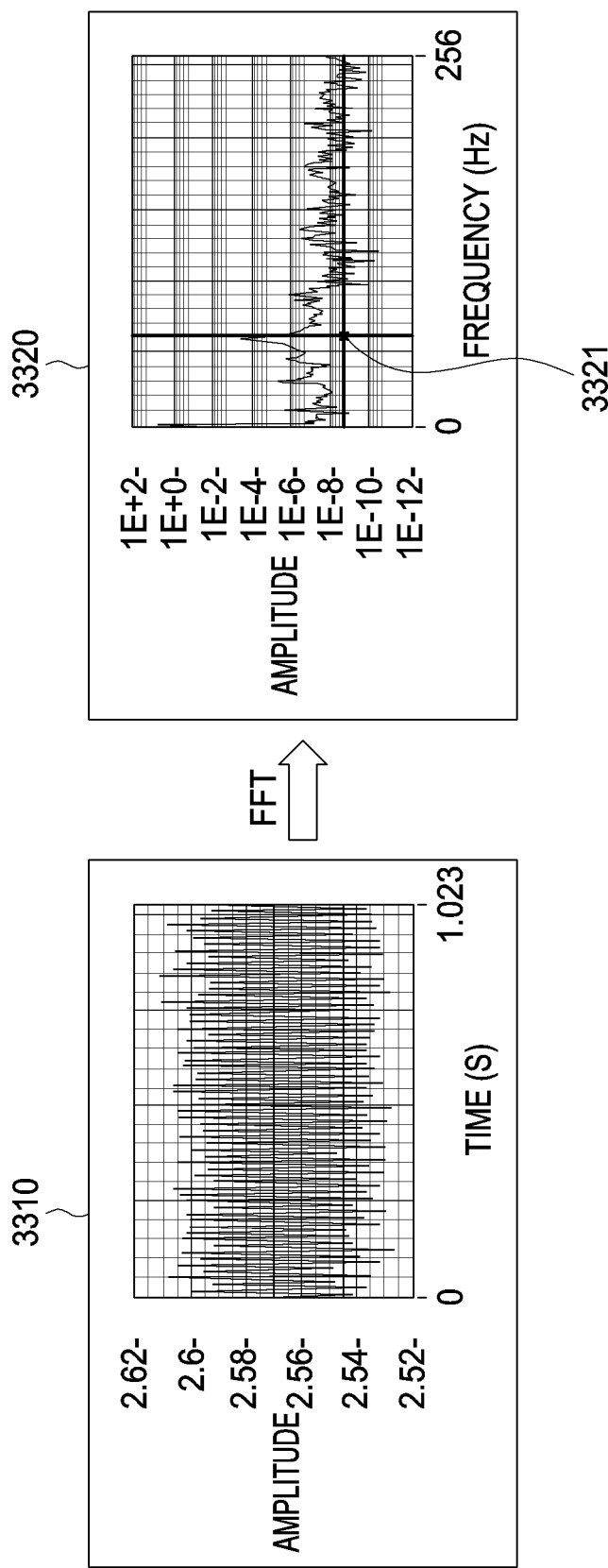
FIG. 33 is a graph illustrating a process of generating a frequency-converted signal according to an embodiment of the present disclosure.

FIG. 33 is a graph illustrating a process of generating a frequency-converted signal according to an embodiment of the present disclosure.

Referring to FIG. 33, the left graph 1310 is a graph of an alternating magnetic pattern that is measured by reading the same into Field-Programmable Gate Arrays (FPGAs) using a magnetic sensor after the alternating magnetic paint corresponding to 60 Hz is constructed.

Here, when a signal acquired from a single analog magnetic sensor is detected through the FPGAs every 5 microseconds (µs) and when the average of 200 detected signals is taken as a single signal, the left graph 3310 is a graph illustrating 1,024 signals that are collected for 1,024 seconds.

Here, the span between the minimum strength and the maximum strength (amplitude) in the left graph 3310 may vary within a signal of about 100 mV (about 2.52 V~2.62 V).

The right graph 3320 is a graph of the result of fast Fourier transform performed on the 1,024 signals, and it can be seen that, when the alternating magnetic pattern is drawn so as to correspond to 60 Hz and when the signal detected through the magnetic sensor is converted, the signal 3321 of 60 Hz is clearly differentiated from other signals, whereby walking information, and the like may be provided using the magnetic pattern signal. That is, because a magnetic signal has characteristics in which it is very sensitive to noise and in which the measurement value thereof varies a lot depending on various kinds of noise, when the magnetic signal is not efficiently measured, it is difficult to acquire desired walking information from the magnetic signal, which is measured in the applied paint. Therefore, the average is calculated after collecting a sufficient number of detected signals, and frequency conversion is performed after collecting the calculated average values, whereby it becomes possible to detect a desired frequency pattern from the magnetic paint applied to the ground.

However, when a magnetic signal is detected using a single magnetic sensor, there may be a lack of means for reducing noise. Therefore, noise is reduced using two magnetic sensors, as will be described later, whereby a frequency corresponding to the alternating magnetic pattern may be more clearly detected.

Figure 34:
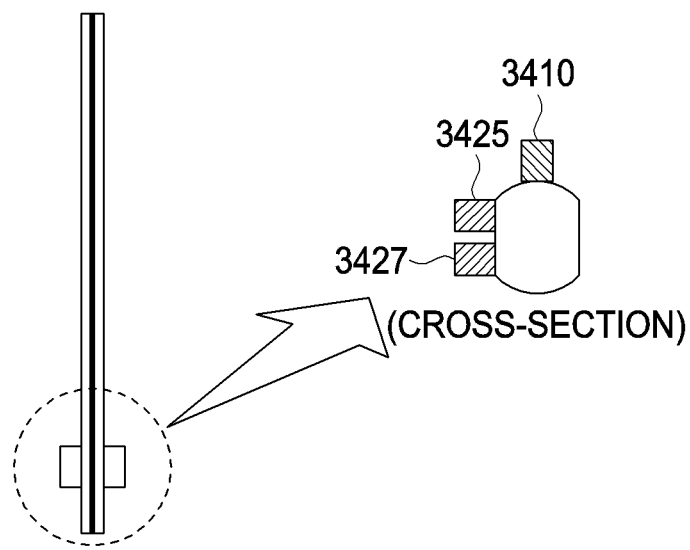
FIG. 34 is a structural diagram of a walking information recognition apparatus in which two magnetic sensors are integrated in the same direction according to an embodiment of the present disclosure.

FIG. 34 is a structural diagram of a walking information recognition apparatus in which two magnetic sensors are integrated in the same direction according to an embodiment of the present disclosure.

Referring to FIG. 34, the walking information recognition apparatus 2010 according to an embodiment of the present disclosure is made in the form of a stick such that a user (a pedestrian or the like) is able to carry the same when walking, two magnetic sensors 3425 and 3427 capable of detecting a magnetic signal are integrated on one side of the stick, and a central marker 3410 through which the center of the stick can be identified may be included.

Here, the first magnetic sensor 3425 and the second magnetic sensor 3427 for detecting a magnetic signal may be located on the same side of the stick such that the same magnetic signal can be detected at different times.

Also, the walking information recognition apparatus 2010 according to an embodiment of the present disclosure may be configured such that two magnetic sensors 3425 and 3427 for respectively detecting magnetic fields in different directions are integrated therein.

More specifically, any one of the two magnetic sensors (3425 or 3427) may be installed in the walking information recognition apparatus 2010 in the direction in which a magnetic field in a vertical direction can be detected, and the other magnetic sensor 3427 or 3425 may be installed in the walking information recognition apparatus 2010 in the direction in which a magnetic field in a horizontal direction can be detected.

Here, when the magnetic field in the vertical direction coming from the paint with which a magnetic pattern is built has the greatest strength, a magnetic signal in the horizontal direction has a relatively small strength.

Here, the walking information recognition apparatus according to an embodiment of the present disclosure may integrate the first and second magnetic sensors therein such that the first magnetic sensor 3425 detects a first magnetic sub-signal corresponding to a vertical magnetic field and such that the second magnetic sensor 3427 detects a second magnetic sub-signal corresponding to a horizontal magnetic field.

Here, the walking information recognition apparatus 2010 according to an embodiment of the present disclosure may reduce a noise signal generated in the vicinity thereof using the difference between the magnetic signals detected by the respective magnetic sensors 3425 and 3427, as will be described later, whereby a signal intended to be detected in the paint may be more clearly read.

Here, the difference between the signals may be acquired using a method of using the difference in detection time between the two sensors.

Figure 35:
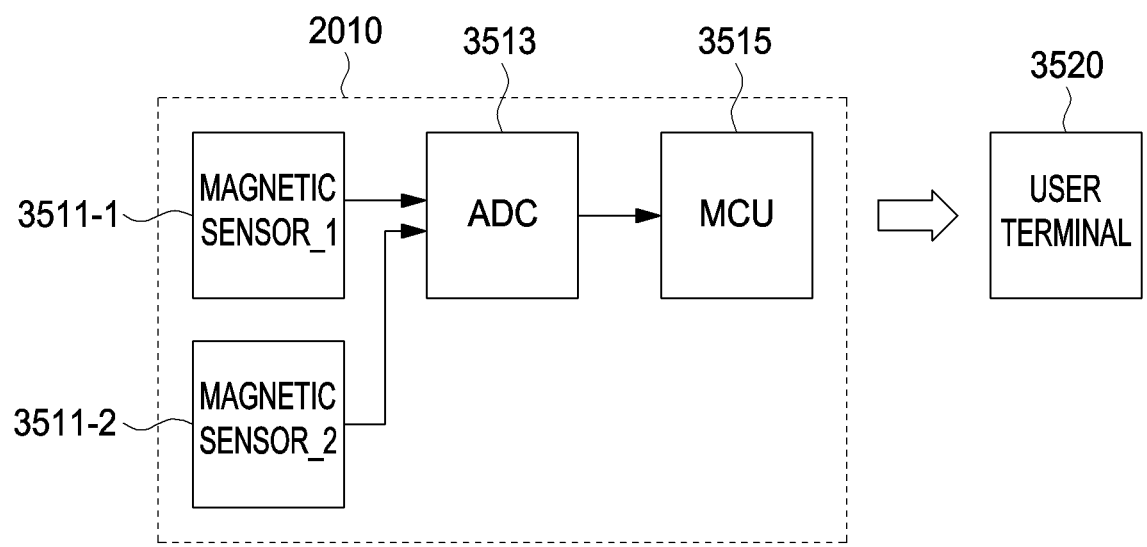
FIG. 35 is a block diagram of a walking information recognition apparatus including two magnetic sensors according to an embodiment of the present disclosure.

FIG. 35 is a block diagram of a walking information recognition apparatus including two magnetic sensors according to an embodiment of the present disclosure.

Referring to FIG. 35, the walking information recognition apparatus 2010 according to an embodiment of the present disclosure may include a first magnetic sensor 3511-1, a second magnetic sensor 3511-2, an Analog-Digital Converter (ADC) 1513, a processor (e.g., an MCU, a MICOM, or the like) 3515, and the like.

Here, the walking information recognition apparatus 2010 according to an embodiment of the present disclosure may generate walking information from magnetic paint applied to a ground, as in an embodiment including a single magnetic sensor, and may provide the walking information to a user terminal 3520 through wired or wireless communication.

Here, the first magnetic sensor 3511-1 and the second magnetic sensor 3511-2 may detect a magnetic signal from the magnetic paint applied to the ground, in which case they may detect the same magnetic signal from the same magnetic paint at different times.

Here, because the magnetic signal may be an analog signal, it may be converted into a digital signal through the analog-digital converter 3513, as will be described later.

Here, the magnetic sensors 3511-1 and 3511-2 may also detect a noise signal due to the earth's magnetic field or an environment in which a magnetic field is generated or induced from nearby iron, or the like. Therefore, the magnetic sensor may use a magnetic sensor configured to detect a dynamic signal rather than a static signal.

The magnetic sensor configured to detect a dynamic signal is not able to detect a signal when it is stationary on the magnetic paint in which magnetic information is recorded, and is able to detect a signal only when it is moving. That is, a sensor capable of detecting a change in a magnetic signal over time may be used.

Here, the analog-digital converter 3513 may convert the analog magnetic signal detected using the first magnetic sensor 3511-1 and the second magnetic sensor 3511-2 into a digital signal such that the processor 3515 is able to process the signal.

Here, the analog magnetic signal detected through the first magnetic sensor 3511-1 and the second magnetic sensor 3511-2 may be the difference between the respective analog magnetic signals detected through the first magnetic sensor 3511-1 and the second magnetic sensor 3511-2, and it will be described in more detail later with reference to FIG. 36.

Here, the analog-digital converter 3513 may be an ADC having the resolution of 12 bits or higher and a sampling rate equal to or greater than 1 kS/s.

Here, the processor 3515 may generate walking information by processing the digital signal converted through the analog-digital converter 1513.

More specifically, the processor 3515 performs Fast Fourier Transform (FFT) on the digital signal, thereby extracting a period of the pattern recorded in the magnetic paint, that is, a frequency.

Here, the processor 3515 may generate the walking information based on the frequency and transfer the same to the user terminal 3520, and it is desirable to transfer the walking information analyzed through fast Fourier transform to the user terminal within one second from signal detection.

Here, a communication method for transferring the walking information may be a short-range wireless communication method, such as Wi-Fi, near-field communication (NFC), Bluetooth, or the like, and the walking information may be communicated in a wired manner.

Figure 36:
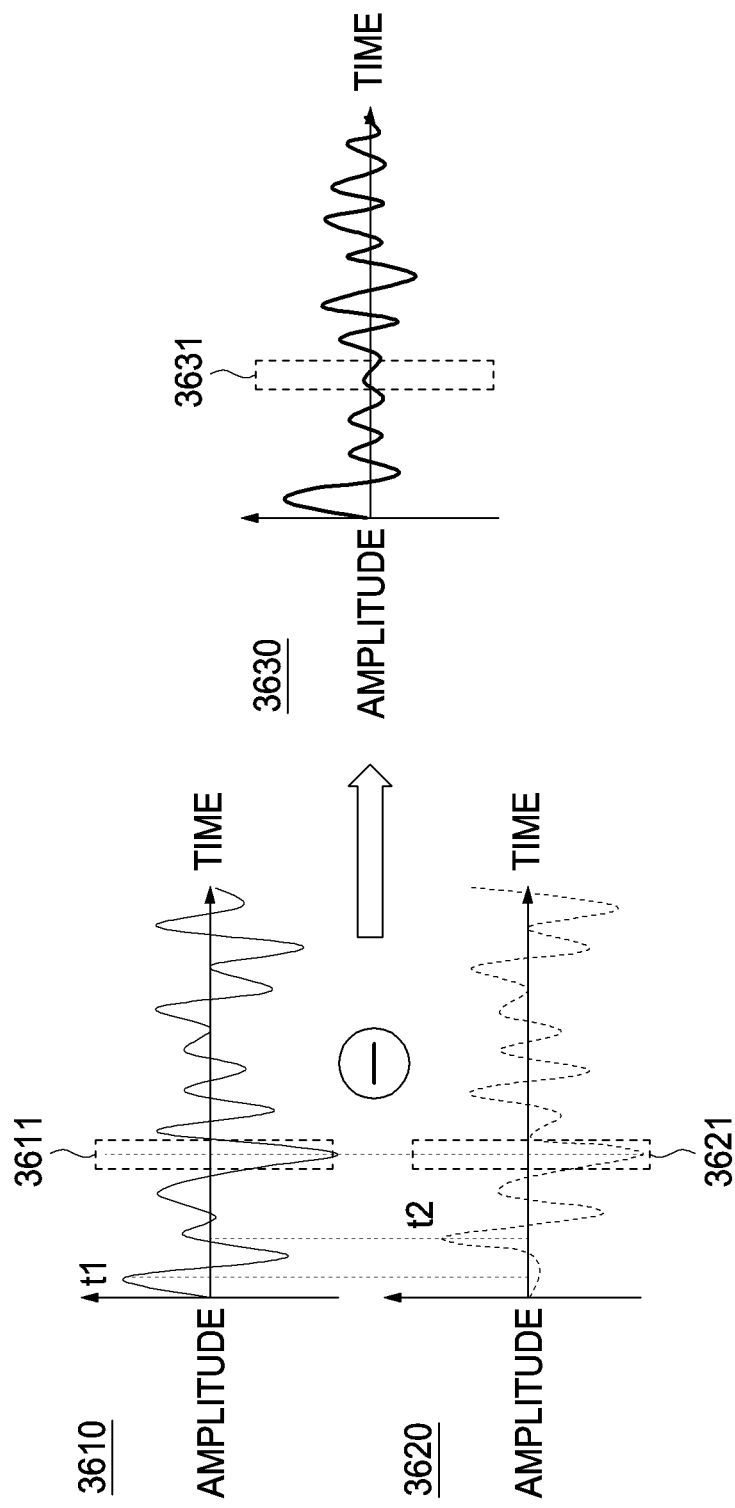
FIG. 36 is a graph illustrating a process of generating a noise-reduced signal according to an embodiment of the present disclosure.

FIG. 36 is a graph illustrating a process of generating a noise-reduced signal according to an embodiment of the present disclosure.

Referring to FIG. 36, the walking information recognition apparatus including two magnetic sensors according to an embodiment of the present disclosure may detect the same magnetic signal at different times.

For example, when the source of the magnetic signal is closer to a first magnetic sensor than a second magnetic sensor, a first magnetic sub-signal 3610 detected through the first magnetic sensor may be detected t2-t1 earlier than a second magnetic sub-signal 3620 detected through the second magnetic sensor.

However, the noise signal 3611 detected by the first magnetic sensor and the noise signal 3621 detected by the second magnetic sensor are input in the same time window without a time difference.

Accordingly, a noise-reduced signal 3630 from which the noise signal 3631 is removed may be generated by calculating the difference between the first magnetic sub-signal 3611 and the second magnetic sub-signal 3620, whereby a frequency recorded in the magnetic paint may be more clearly extracted.

Here, the noise-reduced signal 3630 may alternatively be the differences between the average signals corresponding to the first magnetic sub-signal 3610 and the average signals corresponding to the second magnetic sub-signal 3602.

Here, the first magnetic sub-signal 3610 and the second magnetic sub-signal 3620 may be acquired by detecting any one of the same horizontal magnetic field or vertical magnetic field, or may be acquired by detecting different horizontal magnetic fields or vertical magnetic fields.

Figure 37:
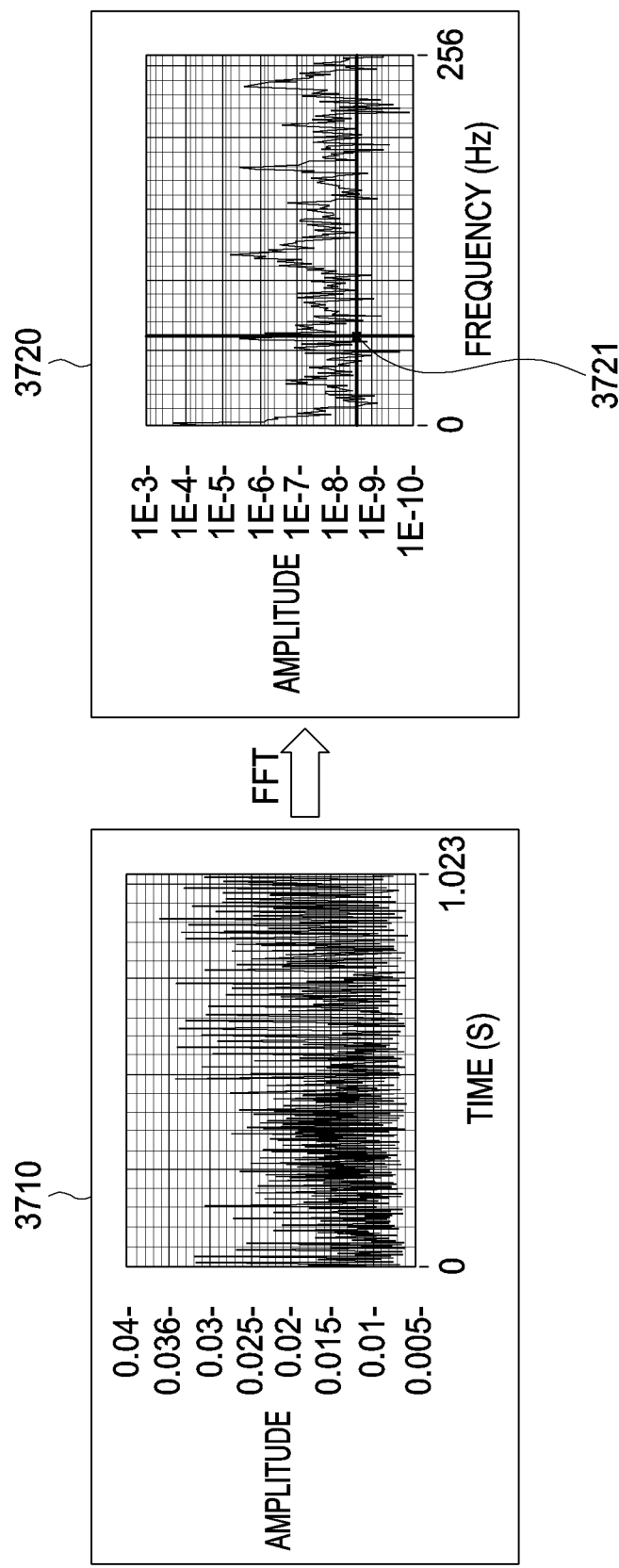
FIG. 37 is a graph illustrating a process of generating a frequency-converted signal using a noise-reduced signal according to an embodiment of the present disclosure.

FIG. 37 is a graph illustrating a process of generating a frequency-converted signal using a noise-reduced signal according to an embodiment of the present disclosure.

Referring to FIG. 37, the left graph 3710 is a graph illustrating a noise-reduced signal, which is the difference between a first magnetic sub-signal and a second magnetic sub-signal detected using a first magnetic sensor and a second magnetic sensor after an alternating magnetic pattern corresponding to 60 Hz is constructed, as in FIG. 32.

When two magnetic sensors are used, as described above, noise may be reduced and the frequency recorded in the magnetic paint may be more clearly extracted.

Here, when the difference between the first magnetic sub-signal and the second magnetic sub-signal is detected through FPGAs every 5 As and when the average of 200 detected signals is taken as a single signal, the left graph 3710 may be a graph illustrating 1,024 signals that are collected for 1,024 seconds.

Alternatively, when each of the first magnetic sub-signal and the second magnetic sub-signal is detected through FPGAs every 5 μs and when the average of 200 detected signals is calculated for each of the first magnetic sub-signal and the second magnetic sub-signal, the left graph 3710 may be a graph illustrating 1,024 signals acquired by collecting the differences between the respective averages for 1,024 seconds.

Here, the span between the minimum strength and the maximum strength (amplitude) in the left graph 3710 may vary within a signal of about 35 mV (0.005 V~0.04 V), and may be about three times less than the amplitude (2.62 V−2.52 V=100 mV) in the case in which detection is performed using a single magnetic sensor.

The right graph 3720 is a graph of a result of fast Fourier transform performed on the 1,024 signals and is the case in which the alternating magnetic pattern that is drawn so as to correspond to 60 Hz is detected, and it can be seen that the magnetic pattern 3721 of 60 Hz may be clearly identified because harmonics of 60 Hz, such as 60 Hz, 120 Hz, 180 Hz, and the like, appear well as the result of conversion of the noise-reduced signal.

Figure 38:
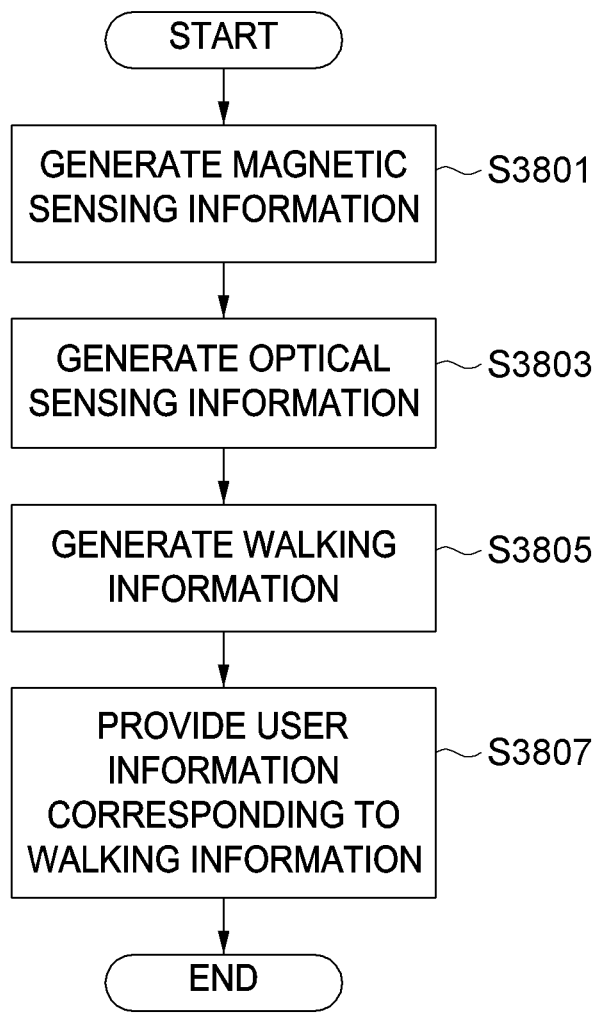
FIG. 38 is a flowchart of a method for recognizing walking information using magnetic/optical patterns according to an embodiment of the present disclosure.

FIG. 38 is a flowchart of a method for recognizing walking information using magnetic/optical patterns according to an embodiment of the present disclosure.

Referring to FIG. 38, in the method for recognizing walking information using magnetic/optical patterns according to an embodiment of the present disclosure, first, magnetic sensing information is generated from magnetic paint applied to a ground using a magnetic sensor at step S3801.

Also, in the method for recognizing walking information using magnetic/optical patterns according to an embodiment of the present disclosure, optical sensing information is generated from the magnetic paint using an optical sensor at step S3803.

Also, in the method for recognizing walking information using magnetic/optical patterns according to an embodiment of the present disclosure, walking information is generated using any one or more of the magnetic sensing information, or the optical sensing information, or a combination thereof at step S3805.

Also, in the method for recognizing walking information using magnetic/optical patterns according to an embodiment of the present disclosure, user information corresponding to the walking information is provided at step S3807.

Here, the magnetic sensing information may correspond to a one-dimensional magnetic pattern or a two-dimensional magnetic pattern.

Here, the optical sensing information may be configured to subdivide the magnetic pattern corresponding to the magnetic sensing information, thereby increasing the amount of information per unit length or unit area, compared to the case in which only the magnetic sensing information is used.

Here, in the method for recognizing walking information using magnetic/optical patterns according to an embodiment of the present disclosure, a method used for generating the walking information based on the magnetic sensing information may vary depending on the optical sensing information.

Here, the walking information may be generated using user terminal sensor information in addition to the magnetic sensing information and the optical sensing information.

Here, the user terminal sensor information may be used for correction of any one or more of the magnetic sensing information, or the optical sensing information, or a combination thereof.

Here, the magnetic sensing information may be used for control of the optical sensor.

Figure 39:
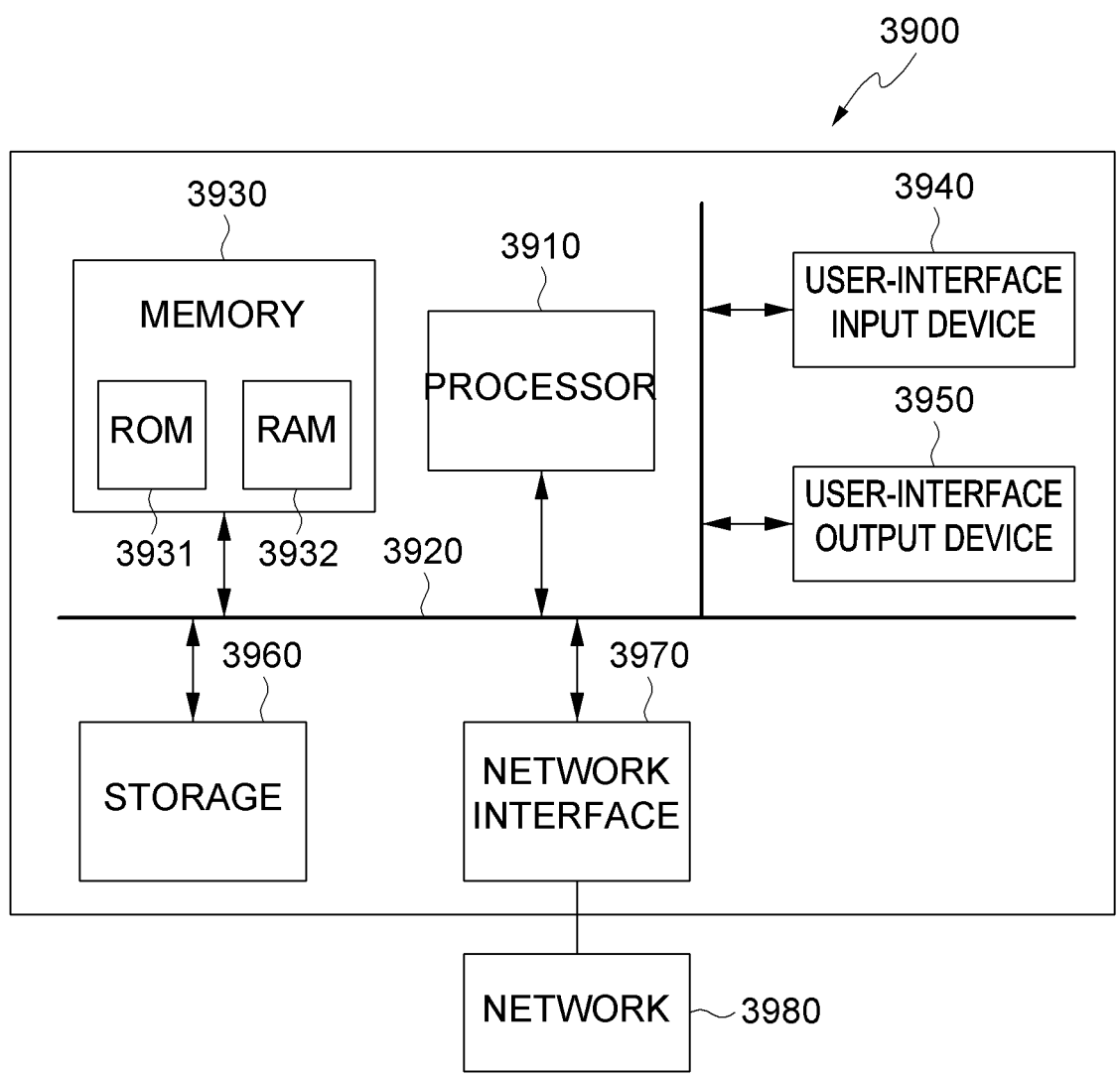
FIG. 39 is a view illustrating a computer system according to an embodiment of the present disclosure.

FIG. 39 is a view illustrating a computer system according to an embodiment of the present disclosure.

Referring to FIG. 39, the embodiment of the present disclosure may be implemented in a computer system such as a computer-readable recording medium or a mobile electronic device. As illustrated in FIG. 39, the computer system 3900 may include one or more processors 3910, memory 3930, a user-interface input device 3940, a user-interface output device 3950, and storage 3960, which communicate with each other via a bus 3920. Also, the computer system 3900 may further include a network interface 3970 connected to a network 3980. The processor 3910 may be a central processing unit or a semiconductor device for executing processing instructions stored in the memory 3930 or the storage 3960. The memory 3930 and the storage 3960 may be any of various types of volatile or nonvolatile storage media. For example, the memory may include ROM 3931 or RAM 3932.

Here, the apparatus for recognizing walking information using magnetic/optical patterns according to an embodiment of the present disclosure includes a magnetic sensor for generating magnetic sensing information from magnetic paint applied to a ground, an optical sensor for generating optical sensing information from the magnetic paint, and a control unit for generating walking information using any one or more of the magnetic sensing information, or the optical sensing information, or a combination thereof and providing user information corresponding to the walking information.

Here, the control unit may correspond to the processor 3900 of the computer system, the magnetic sensor and the optical sensor may communicate with the processor 3900 via the bus 3920, and the generated magnetic sensing information and optical sensing information may be stored in the memory 3930 or the storage 3960.

Here, the magnetic sensing information may correspond to a one-dimensional magnetic pattern or a two-dimensional magnetic pattern.

Here, the optical sensing information may be configured to subdivide the magnetic pattern corresponding to the magnetic sensing information, thereby increasing the amount of information per unit length or unit area, compared to the case in which only the magnetic sensing information is used.

Here, in the apparatus for recognizing walking information using magnetic/optical patterns according to an embodiment of the present disclosure, a method used for generating the walking information based on the magnetic sensing information may vary depending on the optical sensing information.

Here, the walking information may be generated using user terminal sensor information in addition to the magnetic sensing information and the optical sensing information.

Here, the user terminal sensor information may be used for correction of any one or more of the magnetic sensing information, or the optical sensing information, or a combination thereof.

Here, the magnetic sensing information may be used for control of the optical sensor.

Accordingly, an embodiment of the present disclosure may be implemented as a non-transitory computer-readable medium in which methods implemented using a computer or instructions executable in a computer are recorded. When the computer-readable instructions are executed by a processor, the computer-readable instructions may perform a method according to at least one aspect of the present disclosure.

As described above, the method and apparatus for recognizing walking information according to the present disclosure are not limitedly applied to the configurations and operations of the above-described embodiments, but all or some of the embodiments may be selectively combined and configured, so the embodiments may be modified in various ways.

The invention claimed is:

1. A method for recognizing walking information using multiple magnetic sensors, comprising:
    generating a magnetic sensing signal from magnetic paint applied to a ground;
    generating a frequency-converted signal using the magnetic sensing signal;
    generating walking information using the frequency-converted signal; and
    wherein the frequency-converted signal is generated by generating detection signals by detecting the magnetic sensing signal at preset periods, generating average signals by averaging a preset number of detection signals, grouping the average signals in a preset conversion unit, and performing frequency conversion thereon.

2. The method of claim 1, wherein the magnetic sensing signal includes a first magnetic sub-signal generated from the magnetic paint through a first magnetic sensor and a second magnetic sub-signal generated from the magnetic paint through a second magnetic sensor.

3. The method of claim 2, wherein the frequency-converted signal is generated using a noise-reduced signal generated using a difference between the first magnetic sub-signal and the second magnetic sub-signal.

4. The method of claim 3, wherein the noise-reduced signal is generated using differences between the average signals corresponding to the first magnetic sub-signal and the average signals corresponding to the second magnetic sub-signal.

5. The method of claim 2, further comprising:
    generating direction information of the magnetic paint using a difference between a time at which the first magnetic sub-signal is received and a time at which the second magnetic sub-signal is received.

6. The method of claim 1, further comprising:
    generating an optical sensing signal from the magnetic paint, wherein generating the walking information comprises generating the walking information using any one or more of the frequency-converted signal, or the optical sensing signal, or a combination thereof.

7. The method of claim 6, wherein the magnetic sensing signal corresponds to a one-dimensional magnetic pattern or a two-dimensional magnetic pattern.

8. The method of claim 6, wherein the optical sensing signal is configured to subdivide a magnetic pattern corresponding to the magnetic sensing signal, thereby increasing an amount of information per unit length or unit area, compared to a case in which only the magnetic sensing signal is used.

9. An apparatus for recognizing walking information using multiple magnetic sensors, comprising:
    a magnetic sensor for generating a magnetic sensing signal from magnetic paint applied to a ground;
    a frequency conversion unit for generating a frequency-converted signal using the magnetic sensing signal;
    a control unit for generating walking information using the frequency-converted signal; and
    wherein the frequency-converted signal is generated by generating detection signals by detecting the magnetic sensing signal at preset periods generating average signals by averaging a preset number of detection signals, grouping the average signals in a preset conversion unit, and performing frequency conversion thereon.

10. A method for recognizing information using magnetic/optical patterns, comprising:
    generating magnetic sensing information from magnetic paint applied to a ground through a magnetic sensor;
    generating optical sensing information from the magnetic paint through an optical sensor;
    generating walking information using any one or more of the magnetic sensing information, or the optical sensing information, or a combination thereof;
    providing user information corresponding to the walking information; and
    wherein the magnetic sensing information corresponds to a one-dimensional magnetic pattern or a two-dimensional magnetic pattern.

11. The method of claim 10, wherein the optical sensing information is configured to subdivide a magnetic pattern corresponding to the magnetic sensing information, thereby increasing an amount of information per unit length or unit area, compared to a case in which only the magnetic sensing information is used.

12. The method of claim 10, wherein a method used for generating the walking information from the magnetic sensing information varies depending on the optical sensing information.

13. The method of claim 10, wherein the walking information is generated using user terminal sensor information in addition to the magnetic sensing information and the optical sensing information.

14. The method of claim 13, wherein the user terminal sensor information is used for correction of any one or more of the magnetic sensing information, or the optical sensing information, or a combination thereof.

15. The method of claim 13, wherein the magnetic sensing information is used for control of the optical sensor.

16. An apparatus for recognizing walking information using magnetic/optical patterns, comprising:
    a magnetic sensor for generating magnetic sensing information from magnetic paint applied to a ground;
    an optical sensor for generating optical sensing information from the magnetic paint;
    a control unit for generating walking information using any one or more of the magnetic sensing information, or the optical sensing information, or a combination thereof and providing user information corresponding to the walking information; and
    wherein the magnetic sensing information corresponds to a one-dimensional magnetic pattern or a two-dimensional magnetic pattern.

* * * * *